Sept. 5, 1967
L. B. JOHNSTON
3,340,128
APPARATUS FOR PRODUCING NONWOVEN FIBROUS PRODUCT
Filed July 30, 1962
8 Sheets-Sheet 2
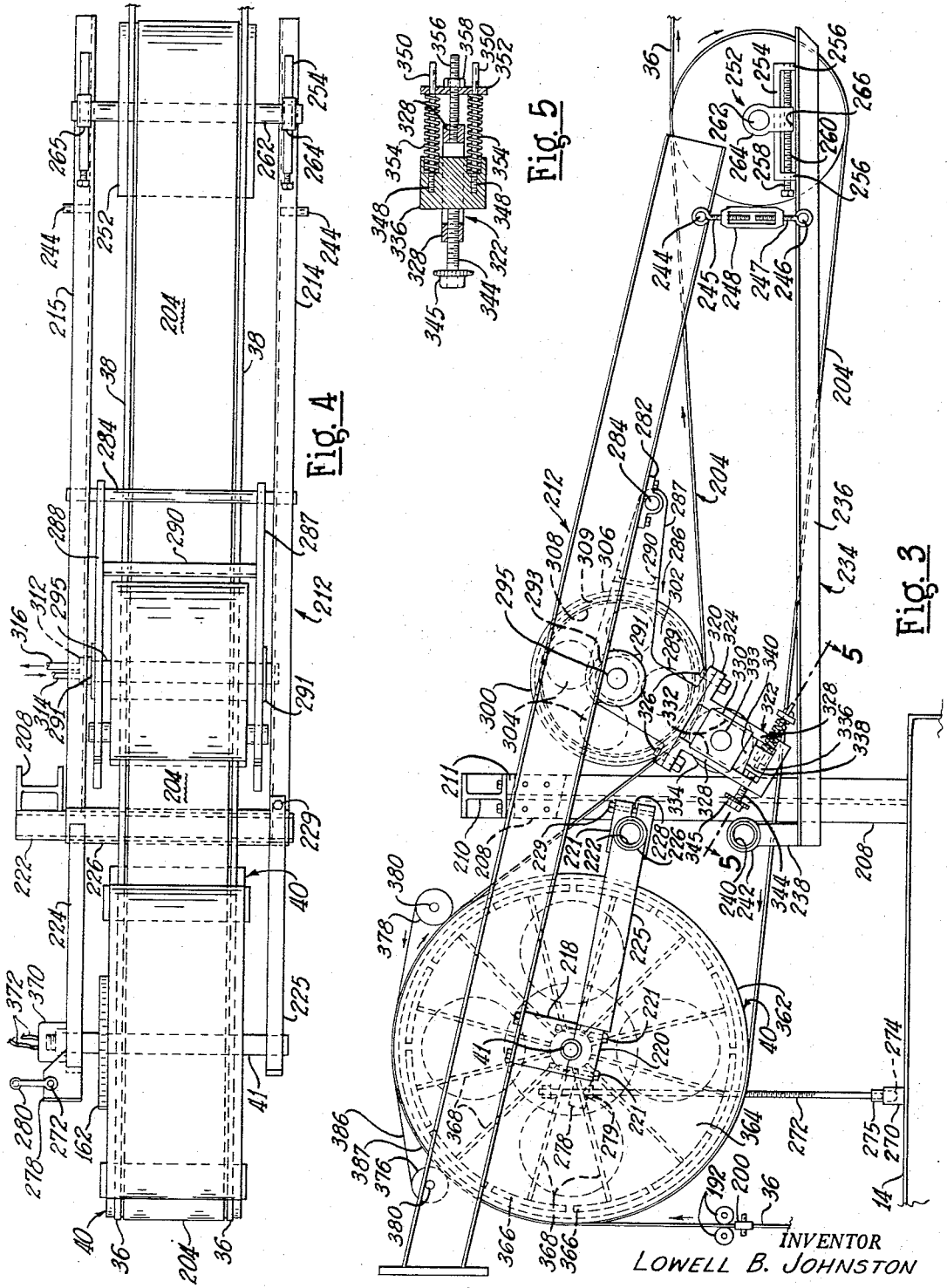
INVENTOR
LOWELL B. JOHNSTON
BY
ATTORNEYS Sept. 5, 1967 L. B. JOHNSTON 3,340,128
APPARATUS FOR PRODUCING NONWOVEN FIBROUS PRODUCT
Filed July 30, 1962 8 Sheets-Sheet 3
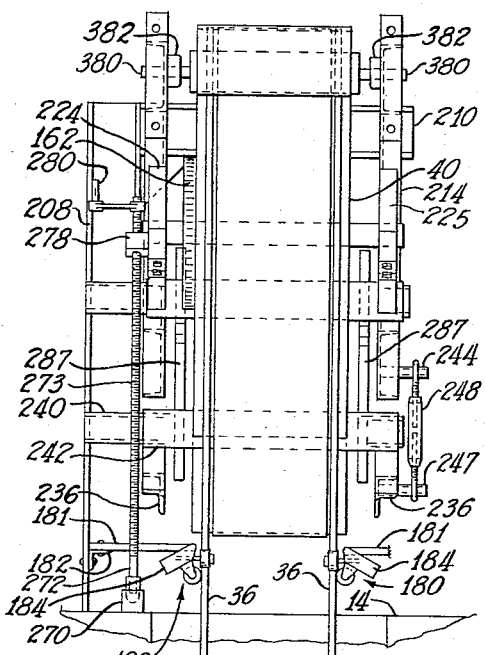
Fig. 6
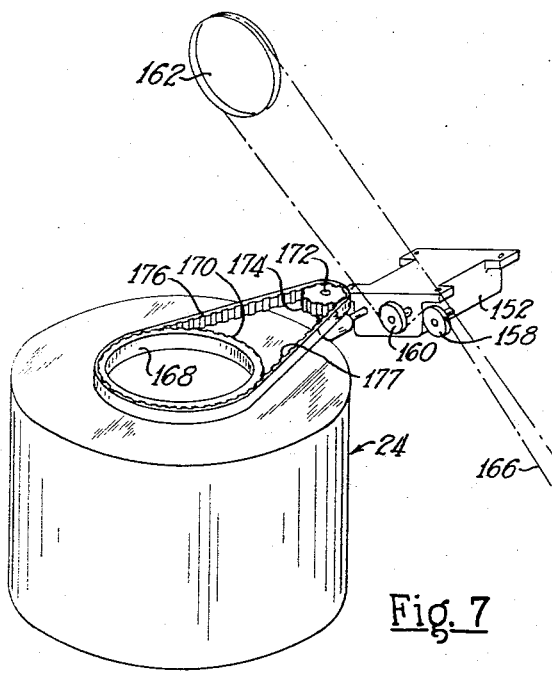
Fig. 7
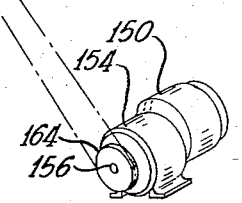
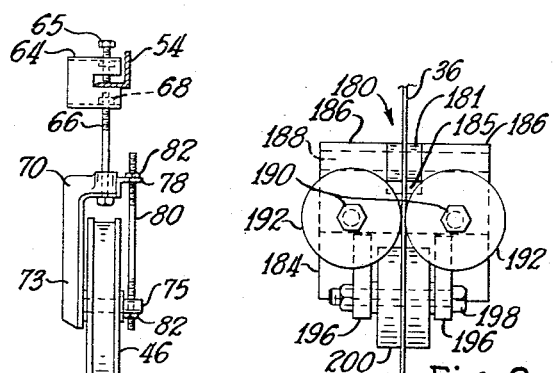
Fig. 10 Fig. 9
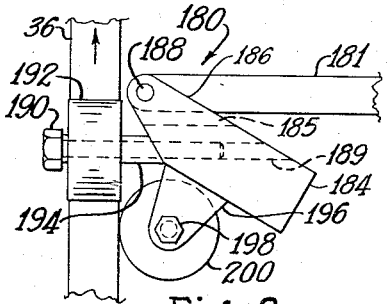
Fig. 8
INVENTOR
LOWELL B. JOHNSTON
BY
ATTORNEYS Sept. 5, 1967     L. B. JOHNSTON     3,340,128
APPARATUS FOR PRODUCING NONWOVEN FIBROUS PRODUCT
Filed July 30, 1962     8 Sheets—Sheet 4
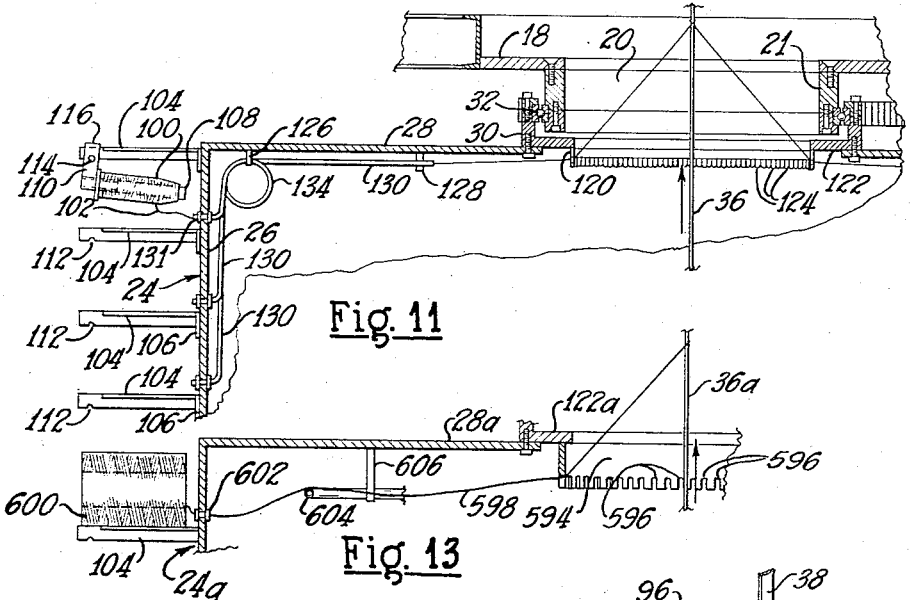
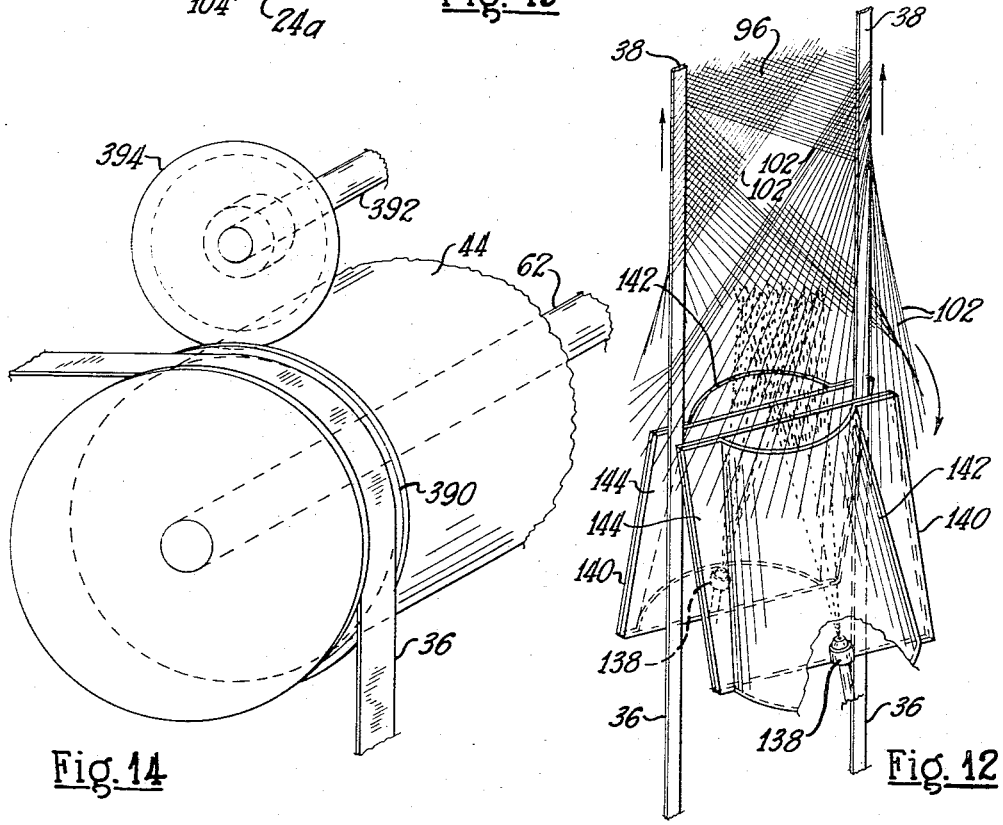
INVENTOR
LOWELL B. JOHNSTON
BY
ATTORNEYS

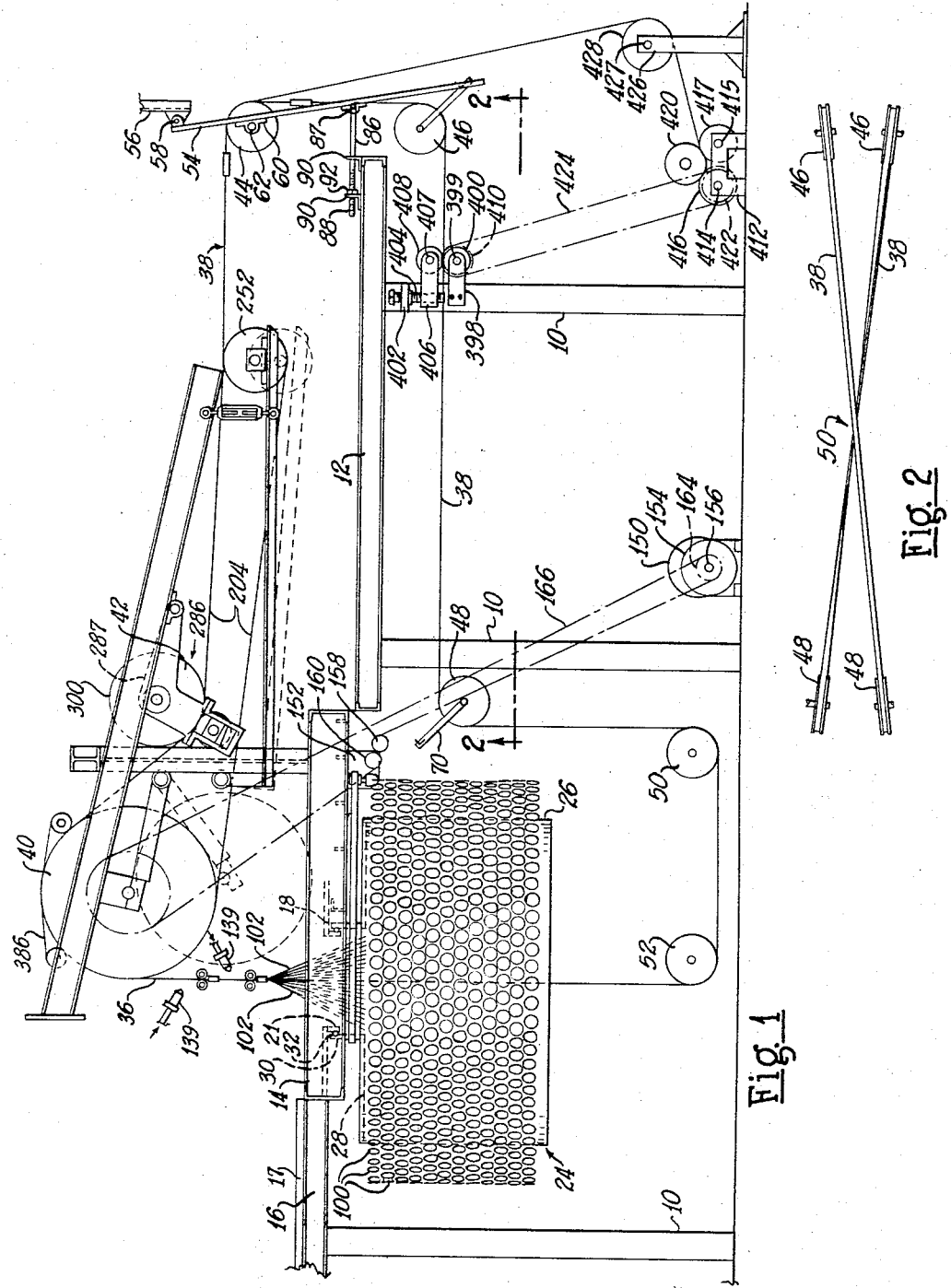

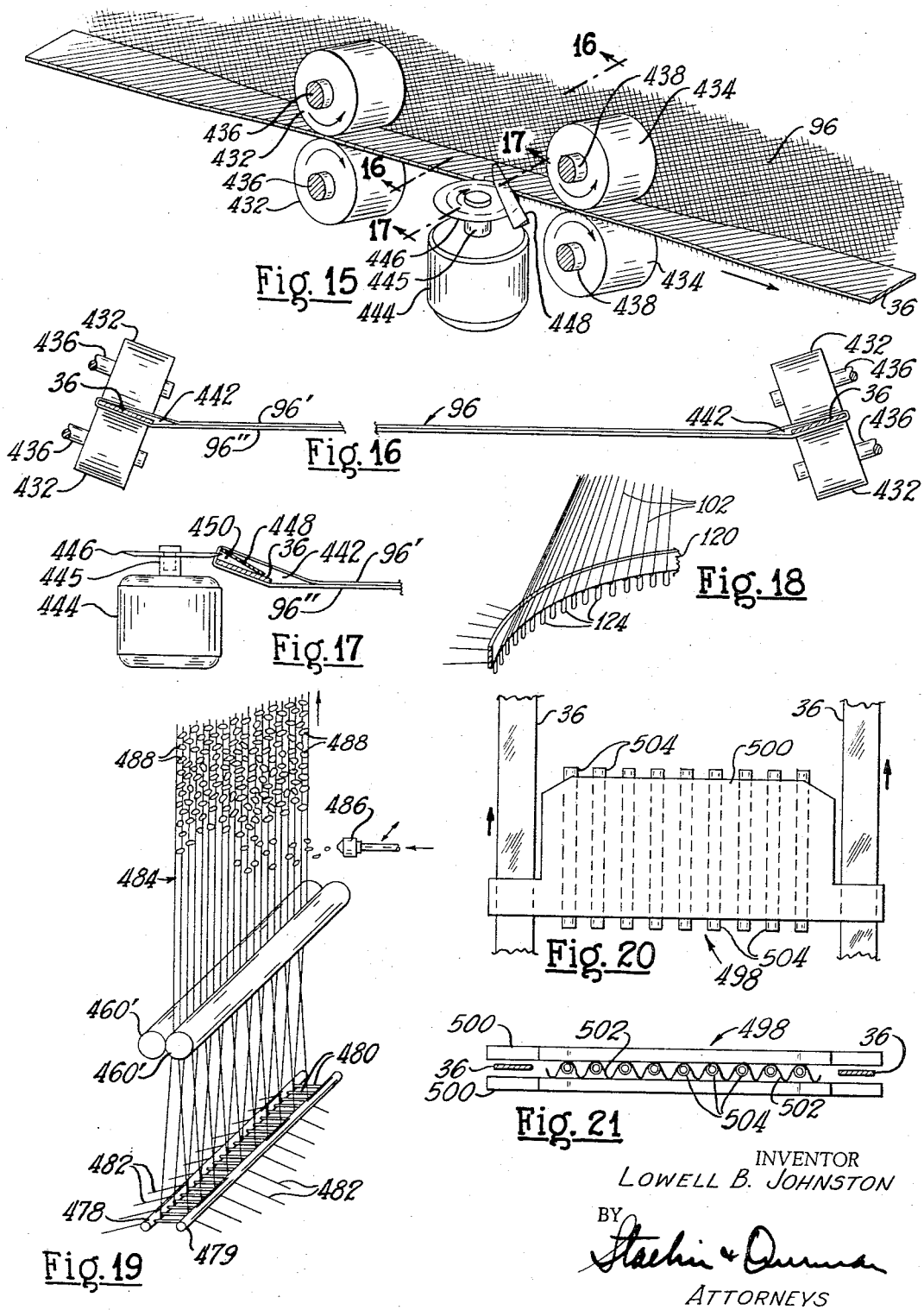

Sept. 5, 1967 L. B. JOHNSTON 3,340,128
APPARATUS FOR PRODUCING NONWOVEN FIBROUS PRODUCT
Filed July 30, 1962 8 Sheets-Sheet 6

INVENTOR
LOWELL B. JOHNSTON
BY
ATTORNEYS

INVENTOR
LOWELL B. JOHNSTON
BY
ATTORNEYS

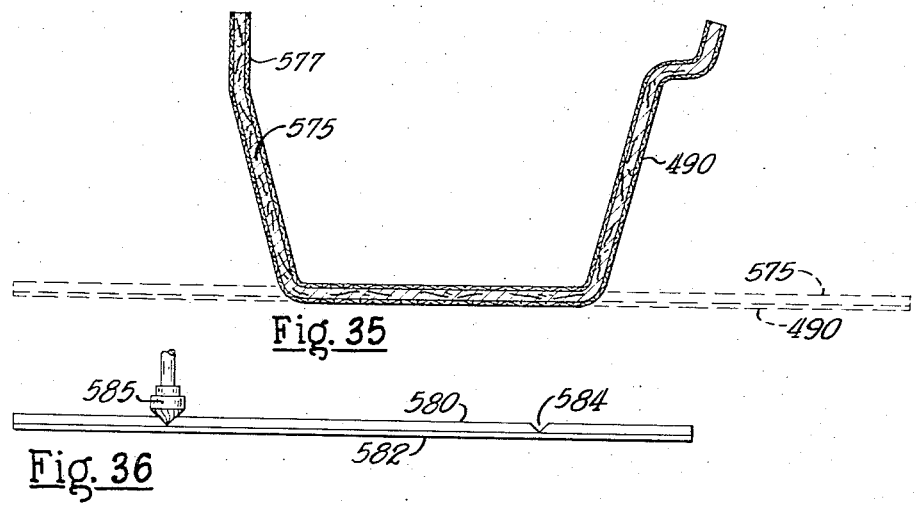
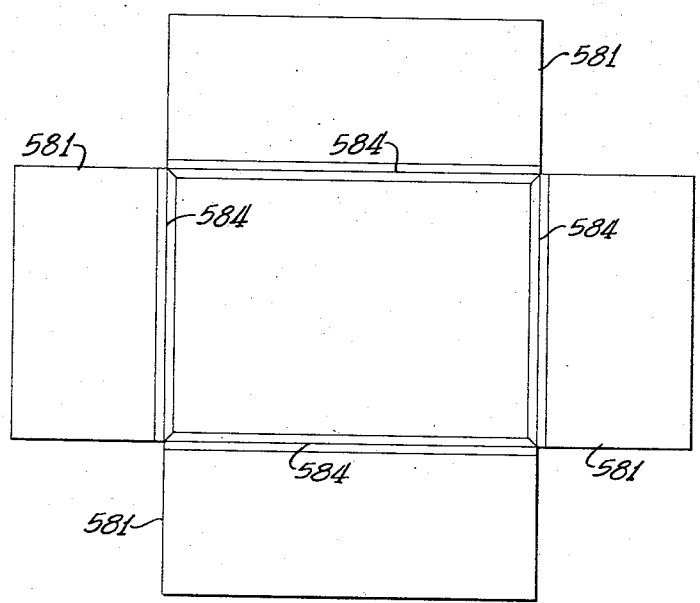
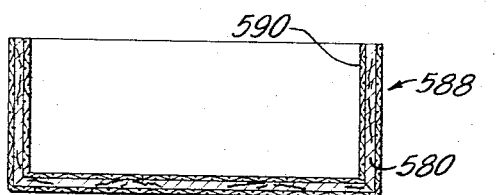

United States Patent Office 3,340,128
Patented Sept. 5, 1967

3,340,128
APPARATUS FOR PRODUCING NONWOVEN FIBROUS PRODUCT
Lowell B. Johnston, Providence, R.I., assignor to Owens-Corning Fiberglas Corporation, a corporation of Delaware
Filed July 30, 1962, Ser. No. 213,513
15 Claims. (Cl. 156—426)

This invention relates to apparatus for producing a nonwoven fibrous or textile product and more particularly to a fibrous or textile product of the scrim type wherein one or more components of the product are fibers or filaments of mineral material such as glass, the apparatus being of a character facilitating the production or manufacture of nonwoven fibrous or textile products of varying character dependent upon the strength characteristics desired and the end uses for the products.

It has heretofore been proposed to fashion a nonwoven scrim type fabric by winding threads or yarns on guides but difficulties have been encountered in attempts to maintain the guides in parallel relation and to move the guides at identical speeds. Prior methods of fashioning unwoven fabrics were not adaptable for varying the pattern or characteristics and strength properties of an unwoven fabric whereby the end product was adaptable only for limited uses.

The invention embraces a method of producing a nonwoven fibrous construction, the steps in the method being subject to variation to vary and control the properties of the nonwoven fibrous construction to render the product adaptable for many and various end uses.

The invention embraces a method wherein filamentary bodies or materials such as strands, yarns, threads or rovings are continuously assembled to form a nonwoven textile wherein the filamentary bodies may be of mineral or inorganic fibers such as glass, the method including the application or delivery of a binder or adhesive onto the strands, yarns or rovings before or after assembly thereof into textile formation and the binder or adhesive set or cured under confined conditions to impart integrity to the fabric.

Another object of this invention resides in a method of forming a nonwoven fibrous product wherein diagonally arranged filamentary material such as strands, yarns or rovings are assembled to form mesh web or scrim fabric or of fashioning a product comprising a plurality of parallel strands, yarns or rovings assembled per se or in conjunction with diagonally arranged strands, yarns or rovings and binder applied in desired amounts dependent upon the end use for the product to modify or vary the properties desired in the product.

Another object of the invention embraces a method of continuously assembling linear bundles of fibers or filamentary materials upon guide surfaces maintained in uniform spaced relation to enhance the formation of a product having substantially uniform characteristics or properties, and of removing the assembly from the guide surfaces in a manner whereby the fabric is produced as a continuous strip or body.

Another object of the invention resides in an apparatus for producing a nonwoven fibrous product fashioned of parallel filamentary materials or of diagonally arranged materials or a composite of such materials or assembling a plurality of filamentary materials with sheets, foils, films or other similar materials whereby the filamentary materials provide reinforcement for the sheets, foils or films.

Another object of the invention is the provision of an apparatus adapted for conparatively high speed fabrication of unwoven or scrim fabric wherein the fibrous components are supported during assembly by parallel flights of an endless means whereby all regions of the fabricated material are advanced uniformly whereby an improved product is attained.

Another object of the invention resides in an apparatus adapted for continuous fabrication of unwoven textile particularly fashioned of filamentary bodies such as yarns, threads, strands or rovings of mineral fibers such as glass fibers or filaments wherein the filamentary bodies or materials of the layers or plies of the unwoven textile are arranged in diagonal or crossing relation and wherein the angularity of the filamentary materials may be varied within wide limit to vary, control or regulate the characteristics and strength properties in the end product, the apparatus being provided with means for applying or delivering a binder or bonding agent onto the product or onto the fibrous materials prior to their assembly in a product thereby to provide a self-supporting unwoven construction of scrim-like character to facilitate handling during further processing operations or in combining or laminating the product with other materials for particular end uses.

Another object of the invention resides in an apparatus for producing a nonwoven fabric embodying effective means for regulating or controlling tension of the strands, yarns or rovings during the assembly thereof into a nonwoven fabric.

Another object of the invention relates to an apparatus for continuously producing a multi-layer or multi-ply nonwoven fibrous product and removing the product from a moving support with a minimum of waste.

Another object of the invention resides in an apparatus of this character embodying parallel flights of guide means or surfaces upon which the filamentary materials are assembled, the arrangement including means continuously and automatically operable for maintaining the flights of the guide means in uniform spaced relation at the region of assembly of the filamentary materials thereon.

Another object of the invention is the provision of a nonwoven or scrim fabric producing apparatus embodying a rotatable creel provided with novel means for individually supporting packages or supplies of strands, yarns or other filamentary materials utilized in the production of the nonwoven product.

Another object of the invention is the provision of a nonwoven fabric embodying mineral fibers such as glass fibers assembled or oriented to promote high extensibility, freedom from inter-abrasion, multidirectional strength, the fabric having superior reinforcing qualities when laminated or combined with like material or other materials.

Another object of the invention is the provision of a fabric or web fashioned of nonwoven filamentary bodies which is particularly usable as a reinforcement for resinous plastics and other materials or which may be readily laminated with sheets, films or webs and which is adaptable for processing through laminating or calendering facilities associated with or used in conjunction with the apparatus of the invention for the continuous production of composite products.

Further objects and advantages are within the scope of the invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIGURE 1 is a semi-schematic side elevational view of a form of apparatus for carrying out the method of the invention;

FIGURE 2 is a fragmentary bottom plan view illustrating the path of traverse of a continuous guide surface or means upon which the fibrous or filamentary unwoven web or textile is supported during formation, the view being taken substantially upon the line 2—2 of FIGURE 1;

FIGURE 3 is an elevational view of a portion of the construction illustrated in FIGURE 1;

FIGURE 4 is a plan view of the construction shown in FIGURE 3;

FIGURE 5 is an enlarged detail sectional view taken substantially on the line 5—5 of FIGURE 3;

FIGURE 6 is an end view of the construction illustrated in FIGURE 3;

FIGURE 7 is a semi-schematic illustration of the driving arrangement for components of the apparatus of the invention;

FIGURE 8 is an enlarged front elevational view of a guide or tape control means forming a component of the invention;

FIGURE 9 is a side view of the construction shown in FIGURE 8;

FIGURE 10 is a detail view showing one of the tape supporting wheels and mounting means therefor;

FIGURE 11 is a fragmentary longitudinal sectional view through a portion of a rotatable creel construction arranged to support supply spools of filamentary material;

FIGURE 12 is a fragmentary isometric view illustrating the method of orientation of the filamentary materials on supporting surfaces or guides in fashioning unwoven textile or fabric;

FIGURE 13 is a view similar to FIGURE 11 illustrating the creel construction adapted to support packages of roving;

FIGURE 14 is a fragmentary isometric view illustrating a method of severing the unwoven fabric from the supporting surfaces;

FIGURE 15 is an isometric view illustrating another arrangement for severing the fabric from the supporting surfaces;

FIGURE 16 is a sectional view taken substantially on the line 16—16 of FIGURE 15;

FIGURE 17 is a detail sectional view taken substantially on the line 17—17 of FIGURE 15;

FIGURE 18 is a fragmentary isometric view of circularly arranged guide means for the filamentary bodies or materials;

FIGURE 19 is an isometric view illustrating guides for directing filamentary bodies or materials in planar parallel relation to form an unwoven web;

FIGURE 20 is an elevational view of another form of guide means for orienting filamentary bodies in parallel orientation in forming and unwoven product;

FIGURE 21 is a top plan view of the guide means shown in FIGURE 20;

FIGURE 35 illustrates an end use product comprising a veneer core laminated or faced with layers of unwoven fabric of the invention;

FIGURE 36 illustrates a method of scarfing or scoring the veneer component faced with unwoven fabric;

FIGURE 37 is a plan view of the scarfed veneer product shown in FIGURE 36, and

FIGURE 38 is a sectional view illustrating a configuration formed of the scored veneer sheet shown in FIGURE 37 faced with unwoven fabric.

Figure 22:
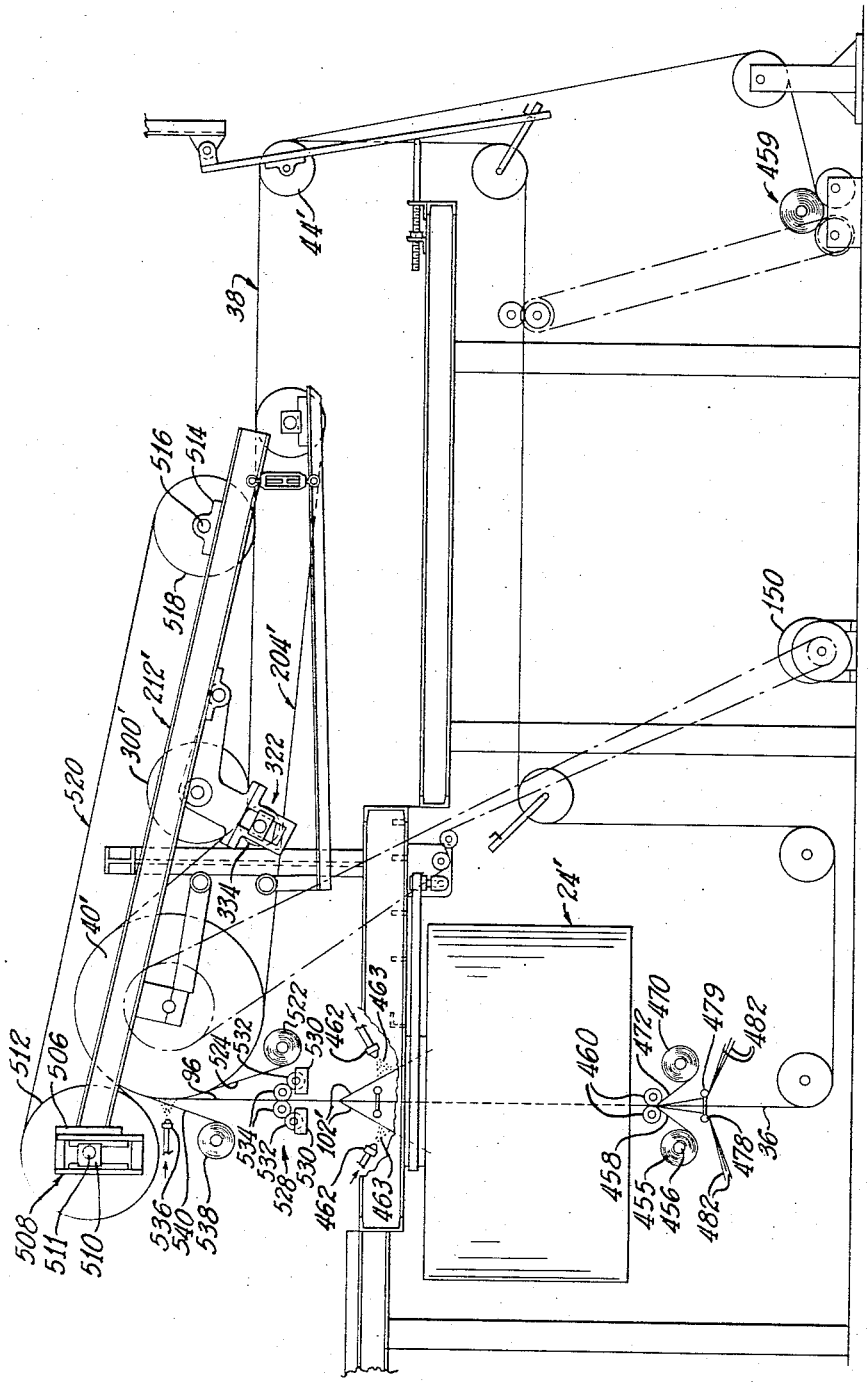
FIGURE 22 is a view similar to FIGURE 1 illustrating a method of assembling filamentary materials about a sheet-like core.

While the method and apparatus of the invention are particularly usable in fashioning or producing a nonwoven fabric or web product of strands, threads, yarns or rovings formed of glass fibers or filaments, it is to be understood that the method and apparatus may be utilized for producing nonwoven fabrics or webs of other mineral fibers or filaments.

The apparatus is adaptable for producing various end products wherein the nonwoven material may be assembled with sheet materials, films or foils or subsequently processed or laminated with other materials or embedded in or disposed between heat-softenable coatings, sheets or films for reinforcement purposes or as reinforcing laminae for various and diverse purposes, uses and end products.

The apparatus illustrated in FIGURES 1 through 12 of the drawings is inclusive of a main frame construction comprising upwardly extending struts or posts 10 and horizontally disposed frame members 12, 14 and 16 arranged as shown in FIGURE 1, the frame 14 supporting a floor construction 18, and the frame members 16 supporting a floor construction 17. An opening 20 preferably circular in shape, defined by a circular or annular member 21, is provided in the floor 18 to facilitate movement of support or conveyor means upon which the unwoven fabric or web product is formed.

A rotatable cylindrically-shaped creel 24 is arranged to be supported for rotation by the frame structure 14. The creel is inclusive of a circular cylindrically-shaped, comparatively thin wall 26 supported by radially arranged arms 28 carried by a central hub portion 30. The hub portion 30 is mounted for rotation upon the frame portion 14 by antifriction bearings 32 such as ball bearings or other suitable bearing means.

While in the present embodiment the rotatable creel 24 is illustrated as suspended from a suitable frame structure, it is to be understood that the creel may be supported upon suitable bearings and support means disposed beneath the creel. The creel 24 is adapted to support supply spools or packages of filamentary materials such as strands, yarns, threads, rovings or other linear or filamentary bodies 102 formed of fibers or filaments of glass or other mineral material and utilized in fashioning the unwoven product.

In certain forms of nonwoven web, fabric or product produced through the use of the apparatus illustrated in FIGURE 1, the product is formed by winding or depositing linear or filamentary bodies or materials from the supply carried by the rotating creel 24 upon spaced vertically moving flights or surfaces 36 of an endless tape or band 38. The tape 38 functions as a support for the nonwoven fabric as it is formed and conveys the formed product through a binder curing station or other processing station or stations, the flights 36 of the tape continuously moving in parallel spaced relation in which the spacing is maintained uniform during formation of the product.

An important feature of the invention pertains to the arrangement of an endless tape or band 38 supported for movement or traverse in a particular path whereby the two parallel flights 36 of the tape move at the same linear rate and distance as they are regions of a single tape or band. As indicated schematically in FIGURE 1, the tape flights 36 engage an endless belt conveyor 204 and both pass partially around a comparatively large drum, roll or member 40 and partially around a second drum 42, the tape flights engaging pairs of guide wheels or rolls 44, 46, 48, 50 and 52.

At the region between the guide wheels 46 and 48, the tape 38 is crossed, as illustrated in FIGURE 2, this crossing being indicated at 50, providing the dual flights 36 upon which the nonwoven fabric is formed at a station above the creel 24. The flights 36 of the endless belt, band or tape 38 are maintained under comparatively high tension so that the winding or deposition of the linear or filamentary materials about the flights 36 will not affect or vary the spacing between the flights at the region of formation of the nonwoven web or fabric thereon.

As shown in FIGURE 1, a supplemental frame 54 is pivotally supported from a stationary member or bracket 56 by means of a pivot pin 58. A pair of bearing brackets 60 carried by the frame 54 journally support a shaft 62 on which is mounted a roll 44. The lower extremity of the frame 54 supports a transversely extending member 64, shown in FIGURE 10, secured to the frame 54 by screws 65. Member 64 supports a pair of mounting means for the tape guide wheels 46, one of which is shown in FIGURE 10. Each mounting means is secured to member 64 by a threaded rod 66 and a nut 68.

Mounted at the forward end of the rod 66 is an L-shaped member 70. A portion 73 of member 70 is equipped with a stub shaft or pin 75 which journally supports a guide wheel 46. Each of the tape guiding wheels is fashioned with tape retaining flanges 77. As shown in FIGURE 10, a strut means or bar 80 engaged with an ear 78 on member 70 and the shaft 75 assist in resisting tension of the tape.

Each tape guiding wheel 46 is swivelly supported by the rod 66 thereby to accommodate the crossing of the tape flights as shown in FIGURE 2. The nuts 82 may be adjusted to resist the tension of the tape. The tape guide wheels are supported in a similar manner by means of a construction of the character shown in FIGURE 10.

As shown in FIGURE 1, a U-shaped member 86 has its transverse portion 87 pivotally connected to the frame 54. The leg portions of member 86 are threaded as at 88 and extend through openings in brackets 90, the threaded portions 88 accommodating adjusting nuts 92. The nuts 92 may be adjusted to control the tension of the tape 38.

FIGURE 11 illustrates the step or winding or depositing a comparatively large number of spaced filamentary bodies such as strands, yarns or threads 102 on the vertically arranged flights 36 of the tape whereby two plies of the bodies are formed with the bodies of the plies or layers being diagonally arranged in the nonwoven product 96. The creel 24 is provided with means for supporting a comparatively large number of cops or supply spools 100 of filamentary bodies 102 utilized in forming the product.

Projecting radially outwardly from the creel wall 26 at circumferentially and vertically spaced regions are bars or members 104. Each supply spool 100 is adapted to fit over a spindle or mandrel 108, each mandrel being carried by a U-shaped bracket 110. Each of the bars 104 is provided with a notch 112 and each member 110 is provided with a transversely extending pin 114 which, when a supply spool and its supporting mandrel are mounted upon a bar 104, the pin 114 fits into the notch 112 and the bight portion 116 of each bracket engages the upper surface of the bar 104 to thereby support each supply spool on the creel. Through this means a supply spool may be readily and quickly removed or replaced without the use of tools.

FIGURE 11 illustrates a spool in an operative position on the creel wherein the pin 114 is engaged in a notch 112 and the weight of the supply material and the mandrel causes the bracket 110 to be tilted as shown in FIGURE 11. In this position the pin 114 is engaged in the notch 112 and prevents inadvertent removal or dislodgment of a supply spool. When the operator wishes to replace a supply spool, he merely tilts the mandrel 108 upwardly which action disengages the pin 114 from the notch 112 permitting the bracket 110 to be moved longitudinally outwardly away from the bars 104.

A material supply spool or package may be telescoped on the mandrel 108 and the bracket 110 engaged with the end of the bar 104, the weight of the spool 100 causing engagement of the pin 114 in the notch 112 to thus retain the supply spool on the creel. In the arrangement shown in FIGURES 11 and 18, the filamentary bodies, such as strands, yarns or threads 102 are guided by suitable means as they are wound about the tapes or guides 36 to form the crossing pattern unwoven fabric 96, shown in FIGURES 12 and 23.

The guide means includes an annular member 120 supported by a second annular member 122, both members rotating with the creel 24. The member 120 is fashioned with circumferentially arranged guide openings 124, the guides serving to space the strands or yarns 102 as they are wound about the movable supports or tape flights 36. When an unwoven fabric having substantially uniformly spaced threads, yarns or strands is desired, the guide openings 124 are spaced circumferentially equal distances apart. If it is desired to produce an unwoven fabric wherein the strands are not substantially uniformly spaced, the guide openings 124 may be spaced to accomplish such purpose.

A further factor in maintaining the strands, threads or yarns in proper spaced relation as they are wound upon the tape flights 36 is tension. One form of tensioning means is illustrated in FIGURE 11. In this form, each strands, thread or yarn 102 is passed through a flexible guide tube 130 carried by supports 126 and 128 depending from the planar member 28 of the creel 24, the entrance end 131 of each tube extending through an opening in the circular wall 26 of the creel at a region adjacent the spool or package supplying the strand, thread or yarn to be drawn through the tube.

The tubes 130 may be fashioned of nylon or of other resinous plastics or suitable materials. The tubes have comparatively small interior diameters sufficient to accommodate a strand, yarn or thread. As shown in FIGURE 11, the tubes 130 may be shaped to provide a coil or convolution in order to accentuate the degree of friction to provide the proper tension in the filamentary material moving therethrough.

It has been found that filamentary materials taken from spools or packages at the lower regions of the creel may be passed through uncoiled nylon tubes 130. Where the materials move through longer tubes, the amount of friction may be sufficient without the coil configurations. It is to be understood that the lengths and configurations of guide tubes 130 may be varied to secure the desired tension in each of the strands, threads or yarns to be wound on the tapes 36.

In order to adhere or join the junctions of the crossing strands, threads or yarns of the plies of the unwoven product, binder or adhesive is delivered onto the strands, threads or yarn. FIGURE 12 is illustrative of one arrangement for delivering binder or adhesive onto the filamentary materials in advance of the winding of the materials around the tape flights 36. As shown in FIGURE 12, applicators 138 are arranged to direct or spray adhesive or binder, preferably in mist form, into the region of the threads or yarns just above the guide member 120.

Any number of binder or adhesive applicators may be used depending upon the type of binder or adhesive and the character of distribution desired. It is preferable to provide means for confining or enclosing the region of application of the binder to prevent excessive waste of binder and avoid contamination of the surrounding area. As shown in FIGURE 12, a pair of stationary members 140 is provided, each having a portion 142 of semi-frusto-conical shape establishing a confined zone through which the binder or adhesive is directed onto the filamentary bodies or materials from the interior of the cone-like formation of filamentary bodies. The members 140 are provided with planar portions 144 which converge toward the plane of the tape flights 36. The members 140 may be supported by suitable means (not shown) disposed adjacent but spaced from the member 120.

The drum or roll 40 and the creel 24, in the embodiment illustrated, are driven concomitantly through power transmission mechanism driven by a motor 150 illustrated in FIGURES 1, 7 and 22. The power transmission mechanism is inclusive of a housing 152 which is preferably supported by the frame structure 14 and contains variable speed reducing mechanism of conventional character for establishing a drive to the creel 24. Associated with the motor 150 is a housing 154 containing conventional speed reducing gearing whereby the output shaft 156 is driven by the motor 150 at a greatly reduced speed.

Journally supported upon the housing 152 is a pair of sprockets 158 and 160, and the supporting shaft 41 of the drum 40 is equipped with a sprocket 162. The output shaft 156 of the speed reducing means 154 is equipped with a drive sprocket 164. A driving chain 166 engages the driving sprocket 164, the intermediate sprockets 158 and 160 and the sprocket 162, as shown schematically in FIGURE 7, whereby the drum 40 is driven at a comparatively slow speed by the motor 150.

The creel 24 is driven through the variable speed power transmission mechanism or gearing contained within the housing 152. As particularly shown in FIGURE 7, the creel 24 is provided with an upwardly extending annular hub portion 168 which is formed with a sprocket portion 170. Driven from the transmission mechanism contained within the housing 150 is a shaft 172 provided with a toothed pulley or gear 174.

As shown in FIGURE 7, a driving belt 176, preferably of flexible character having teeth 177, engages the drive pulley 174 and the sprocket or toothed member 170 whereby the creel 24 is driven at a comparatively low speed through the power transmission mechanism contained in housing 152. The power transmission or speed reducing gearing contained within the housing 152 is of a character wherein the speed of the driving pinion 174 for the creel may be varied with respect to the driving speed of the sprocket 162 driving the drum 40 in order to modify or vary the angularity of the filamentary materials wound upon the tape flights 36.

It is essential to the satisfactory deposition of the filamentary materials on the tape flights 36 that the tape flights be maintained in taut or tensioned condition and in exact parallelism at the region of deposition of the materials thereon. Parallelism of the tapes must be maintained in order to secure a nonwoven fabric of uniform width and uniform tension in the diagonally arranged filamentary materials.

FIGURES 6, 8 and 9 illustrate a novel arrangement 180 for attaining this result. The means is inclusive of support bars 181 fixedly secured to the frame structure by brackets 182, one of the brackets being illustrated in FIGURE 6. The tape control devices are preferably arranged in pairs as illustrated in FIGURE 6. A member 184 is formed with a slot 185 to accommodate the end of the supporting bar or member 181.

The leg portions 186 of member 184, provided by the slot 185, and the end region of the bar 180 have aligned openings accommodating a pivot pin 188, as shown in FIGURES 8 and 9. The member 184 is provided with a pair of threaded openings 189, each opening accommodating a threaded member or bolt 190. Journaled on each of the bolts 190 is a roller 192, the peripheries of the rollers 192 being in frictional engagement with opposed major surfaces of a tape flight 36. A spacer or bushing 194 is provided between the member 184 and the adjacent roller 192 to properly position the roller.

The member 184 is provided with depending portions or brackets 196 having openings accommodating a bolt 198. Journally mounted upon the region of the bolt between the brackets 196 is a roller 200, the peripheral surface of which is in constant engagement or contact with the edge of a tape flight 36 as shown in FIGURES 6 and 8. The member 184 is pivoted at 188 to the adjacent bar 181. The weight of the member 184 tends to swing the member 184 in a clockwise direction about the axis of the pin 188 so that there is always a biasing force or weight maintaining the roller 200 in engagement with the edge of the adjacent flight of the tape.

As shown in FIGURES 6 and 8, when the adjacent flight of the tape 36 is in its proper position parallel with the opposite flight, the axis of each roller 192 of the pair is normal or at right angles to the lengthwise direction of movement of the tape flight 36. Should the flight of the tape tend to deviate from its parallel path, the roller 200, being biased into engagement with the edge of the tape flight, is moved by the tape, swinging or tilting the member 184 about the axis of the pivot shaft 188.

This tilting or shift in the relative position of member 184 likewise shifts or modifies the position of rollers 192 and their journal supports 190, moving the axes of the rollers out of a position normal to the lengthwise direction of movement of the tape flight. The shift in the angularity of the axes of rollers 192 places the peripheries of the rollers askew to the tape 36 which causes the tape to be moved transversely under the influence of a biasing force developed by reason of the askew positions of the rollers.

For example, if the flight of the tape 36 during its lengthwise normal movement shifts its position transversely to the right, as viewed in FIGURE 8, the roller 200 is moved in a like direction causing counterclockwise movement of member 184 about the pivot 188. This movement of member 184 shifts the angular positions of the journals 190 with respect to the tape flight. This action shifts the rollers 192 into an askew position and, through rotation of the rollers 192 in frictional contact with the tape flight, the latter is biased toward its normal path of movement.

If the tape deviates from its normal path in a left-hand direction, as viewed in FIGURE 8, the member 184 is swung in a clockwise direction, shifting the axes of the journals 190 and the axes of the rollers 192 to an askew position in the opposite direction, causing the tape to be biased toward its normal position. In normal position, the axes of the rollers 192 are exactly normal or at right angles to the direction of movement of the adjacent tape flight 36.

As shown in FIGURE 6, there is a tape control means 180 for each tape flight so that each is individually controlled independently of the other. It is to be understood that while there is one pair of controls 180 for the tape flights illustrated in FIGURE 6, several pairs of controls are arranged along the tape flights above the position of the pair of controls illustrated in FIGURE 6. Through this control arrangement, the flights 36 of the tape 38 are maintained at a uniform spacing and are moved in parallel relation so that there is no shifting or migration of the filamentary materials 102 deposited on the tape flights.

The rotation of the drum 40 constitutes a driving means for a comparatively thin, flexible metal endless conveyor or belt-like member 204 which lies between the flights 36 of the tape, as shown in FIGURE 4, and the tape flights likewise driven by the moving conveyor. The conveyor 204, the drum 40 and associated components are particularly illustrated in FIGURES 3 and 4. The frame structure of the apparatus includes an upwardly extending strut or member 208 to which is secured a transversely extending beam or frame member 210, as shown in FIGURES 3, 4 and 6, the assembly of conveyor belt 204, drum 40 and other components being supported from the transversely extending beam 210.

The assembly includes a supplemental or auxiliary frame 212 comprising frame members 214 and 215 preferably of channel configuration, the channel members being secured to the transverse beam 210 by brackets or members 211. Depending from each of the frame members 214 and 215 is a journal block 218 provided with a bearing cover 220, the bearing blocks and covers respectively providing bearing means journally supporting the shaft 41 carrying the drum 40.

Secured to the vertical frame member 208 is a bracket 221 forming a mounting means for a tubular shaft 222. Bars or members 224 and 225 are connected with the bearing means 218 at opposite sides of the drum 40 to resist the thrust which is placed upon the drum 40 by the tension of the endless conveyor 204. The shaft 222 supports a member or sleeve 226. The arm 224 is welded or otherwise fixedly secured to the sleeve 226. The arm 225 is removably secured to the sleeve 226 in order to assemble the drum 40 with the frame 212.

The end of the arm 225 adjacent the sleeve 226 is split as shown at 228 so that the arm may be telescoped onto the end region of the sleeve 226, and a clamping nut 229 drawn up to securely fasten the arm 225 to the sleeve. A second supplemental frame 234 disposed beneath the frame 212 includes a pair of parallel rails or beams 236, each beam being provided at its left-hand end as viewed in FIGURE 3 with an upwardly extending member 238. Fixedly secured to the frame strut 208 is a transversely extending hollow tube or shaft 240 supporting a sleeve 242.

The upper ends of the members 238 are welded or otherwise secured to the sleeve 242. In this manner the supplemental frame 234 is pivotally supported by the shaft 240. The frame members 214 and 215 are arranged to be connected respectively with the parallel beams or members 236, one of the connecting means being illustrated in FIGURE 3. Each of the frame members 214 and 215 is provided with an anchor pin 244 supporting a threaded eye bolt 245. The adjacent frame member 236 is provided with an anchor pin 246 equipped with a threaded eye bolt 247.

The threads on the eye bolts 245 and 247 are respectively right-hand and left-hand threads to accommodate turnbuckles 248. Rotation of the turnbuckle provides means for adjusting the position of the frame 212 with respect to the frame 234 about the axis of the shaft 240. A drum or roll 252, providing a support for the endless conveyor 204, is supported at the distal end regions of the members 236 of the supplemental frame 234. Mounted upon each of the members 236 is a bracket 254 having end flanges 256 welded or fixedly secured to a member 236.

Revolubly mounted in openings formed in the flanges 256 of each bracket is a member 258. The portion 260 of the member 258 between the flanges 256 is threaded as shown in FIGURE 3. The drum or roll 252 is carried by a shaft 262 supported in journal blocks or bearing members 264, a bearing block being arranged above and adjacent each of the parallel members 236. Each of the bearing blocks 264 is provided with a threaded bore to receive the threaded portion 260 of the adjacent member 258 as shown in FIGURE 3.

Each bearing block 264 is provided with a flat or planar lower surface 266 which is slidable along the upper surface of the adjacent member 236. The bearing blocks 264 may be adjusted lengthwise of the members 236 by rotation of the members 258 which, through their threaded connections with the bearing blocks, effect movement in either direction dependent upon the direction of rotation of the members 258. Through this means the tension in the endless conveyor 204 may be adjusted or varied as desired.

Means is provided for raising and lowering the drum or roll 40 in order to assemble the endless conveyor 204 on the drum. With particular reference to FIGURES 3, 4 and 6, a pillow block or bracket 270 is secured to the platform 14. A vertically disposed rod or strut 272 is fashioned at its lower end with a bearing member 274 journaled in the bearing block 270 and secured within the block 270 by a sleeve 275. The member 272 is threaded as at 273 throughout a portion of its length.

Secured to the arm 224 is a projection 278 equipped with a threaded swivel nut 279, accommodating the threaded portion 273 of the shaft or rod 272. The upper end of the shaft 272 is provided with a crank 280 for rotating the shaft 272 which, through its threaded connection with the nut 279 facilitates lowering and raising the shaft 41 and drum 40 when the screws 221, holding the bearing caps 220 in position, have been removed.

The apparatus embodies means articulately connected with the frame 212 for establishing substantial tension or tension stress in the flexible conveyor 204 and for temperature conditioning or cooling the product carried by the tape flights 36. This arrangement is illustrated in FIGURES 1, 3, 4 and 6. Secured to each of the parallel beams 214 and 215 of the frame 212 is a bearing block 282 in which is journaled a shaft or rod 284. Pivotally supported upon the shaft 284 is a belt tensioning unit 286.

The unit 286 is inclusive of a frame structure comprising arms 287 and 288 having bores in the distal ends of the arms receiving the shaft 284 preferably welded to the arms. The arms are reinforced and held in spaced relation by a connecting member 290 having its ends welded to the arms 287 and 288. The arms 287 are of bell crank shape having downwardly extending portions 289 equipped with housings 291 enclosing bearings 293 journally supporting a hollow or tubular shaft 295. The shaft 295 supports a drum or roll 300 which is of hollow configuration.

The drum 300 is provided with end heads 302 each end head being formed with comparatively large openings 304 to reduce the weight of the assembly and facilitate circulation of air therethrough. The periphery of the drum is formed as a comparatively thick circular band 306. The drum is provided with a circular member 308 spaced inwardly from the outer band 306. The annular space 309 between the member 308 and the band 306 provides a jacket through which fluid may be circulated for temperature conditioning the peripheral region of the drum. One end region of the hollow shaft is provided with a sealing means 312 through which extends an inlet pipe 314 and an outlet pipe 316.

The inlet pipe 314 may be connected with a source of supply of temperature conditioning fluid such as water or other suitable gas or liquid for either transferring heat away from the drum in which event, a cooling liquid or gas would be employed, or for transferring heat to the drum in which event heated liquid, steam or other heated fluid would be employed.

The unit 286 is inclusive of a gage roll arranged to engage the inner surface of the endless conveyor 204, which cooperates with the roll or drum 300 to size or control the thickness of the unwoven product. As particularly shown in FIGURE 3, the depending portions 289 of the arms 287 are provided with flanges 320 and there is secured to each arm a U-shaped bracket 322 having flanges 324 mating with the flanges 320 secured together by bolts 326. Disposed between the parallel leg portions 328 is a bearing block 330 having grooves 332 formed therein for accommodating the leg portions 328 which form ways along which the bearing blocks 330 may be adjusted.

Each block 330 provides a bearing for a shaft 333 upon which is rotatably mounted a gaging drum or roll 334, the periphery of the roll contacting the inner surface of the endless conveyor 204. Means is provided for exerting pressure upon the roll 334 in a direction toward the drum 300 in order to fashion a product of predetermined thickness by sizing the product as it moves through the region between the rolls or drums 300 and 334. Arranged in the bight portion of each U-shaped member 322 is a wedge block 336, the upper angular surface 338 of which mates with a reciprocally shaped angular surface formed on a key 340 engaging the lower surface of the adjacent bearing block 330.

It will be obvious from FIGURE 3 that by moving the wedge block 336 in a generally left-hand direction that the angular surface of the block 336 and the key 340 will effect upward movement of the bearing blocks 330 and the drum 334 journaled in the bearing blocks. FIGURES 3 and 5 illustrate a means associated with each wedge block 336 for adjusting or limiting the relative position of the same, resilient means being provided to maintain resilient biasing pressure upon the wedge block 336 to maintain the roll 334 in a desired relative position with respect to the drum 300.

With particular reference to FIGURE 5, it will be seen that the one leg 328 of the U-shaped member 322 is provided with a threaded opening accommodating a threaded member 344 equipped with a manipulating knob or grip member 345. By adjusting the members 344, the wedge blocks 336 may be adjusted to predetermined positions which limit the uppermost position to which the gage roll 334 may be moved to size the thickness of the product.

As shown in FIGURE 5, each wedge block 336 is provided with two threaded bores 348 to receive the threaded extremities of two rods or bars 350. Slidably received on the bars 350 is an abutment or yoke member 352. Disposed between the yoke member 352 and the wedge block 336 and surrounding the bars 350 are expansive coil springs 354 for normally urging or biasing the wedge block 336 into contact with the adjustable abutment screw 344.

The other leg 328 is fashioned with a threaded bore to receive a threaded member 356 extending through an opening in the yoke or abutment member 352. The threaded member 356 is provided with an adjusting nut 358 which may be adjusted to change the position of the yoke or abutment 352 with respect to the member 322 to increase or decrease the expansive pressure exerted by the springs 354 upon the wedge block 336. The threaded member 356 is then locked in adjusted position by manipulation of the lock nut 358.

It will therefore be apparent from the foregoing description that the relative position of the sizing roll 334 may be determined by manipulation of the threaded abutments 344 to predetermine the thickness of the product, and the yokes 352 adjusted by manipulation of nuts 358 to vary the pressure exerted by the springs 354 on the wedge blocks. The drum 40 comprises a circular band 362 supported by end heads or walls 364 provided with large openings to reduce the weight of the drum.

The interior of the drum is provided with means for applying heat through the drum periphery to cure the binder, adhesive or integrating agent applied to the unwoven or scrim product. Disposed at the interior surface region of the band 362 are heating elements 366, which in the embodiment illustrated, are electrically energizable for supplying heat to the periphery of the drum. The heating elements 366 may be supported from a hub portion of the drum by struts or supports 368 as shown in FIGURE 3. The shaft 41 is hollow and accommodates electrical conductors for energizing the heating elements 366.

One end of the shaft projects into a cap or housing 370 through which extend current conductors 372 connected with a source of electric energy. Contact rings (not shown) are enclosed in the cap 370 to facilitate conduction of current to the heating elements. It is to be understood that other means of applying heat to the drum 40 may be used, such as heated liquids or gases. Where heated liquids or gases are employed, a jacket means may be arranged adjacent the inner peripheral region of the band 362 in a manner similar to that shown in the roll 300 hereinbefore described.

Means may be provided associated with the drum or roll 40 to guide and maintain the unwoven product in contact with a surface area of the conveyor 204 during thermal conditioning of the binder or other agent in the product. With particular reference to FIGURES 1, 3, 4 and 6, rolls 376 and 378 mounted upon shafts 380 are arranged adjacent peripheral regions of the drum 40, the shafts 380 being journaled in suitable bearings carried by brackets 382 which may be supported upon the frame members 214 and 215 as shown in FIGURE 6.

And endless belt 386 engages and is guided by the rolls 376 and 378 whereby the inner flight 387 thereof conforms to the cylindrically shaped contour of the exterior surface of the drum or cylindrical member 40, the unwoven product being disposed between the endless conveyor 204 and the flight 387 of the hold-down belt. The rolls 376 and 378 are spaced to exert desired tension in the belt 386. As shown in FIGURE 3, the flight 387 of the belt embraced approximately 90° of the peripheral area of the drum 40 but the belt may be of a dimension and the rolls 376 and 378 spaced to provide for greater or lesser area of contact of the flight 387 with the product depending upon the duration of the period of thermal conditioning or curing of the binder in the product.

The endless belt conveyor 204 may be fashioned of metal ribbon or strip such as steel. It is desirable to provide a protective coating on the flexible metal belt and a coating of Teflon (polytetrafluoroethylene) has been found to be satisfactory for the purpose as it is resistant to the temperatures at which the product is subjected during thermal treatment.

From FIGURE 3 it will be apparent that the unit assembly 286 is supported by the endless belt conveyor 204, the weight of the unit providing comparatively high tension stress in the conveyor. Means is provided for severing the unwoven product 96 from the flights 36 of the supporting tape 38 and such severing step is preferably performed between the region at which the tape and product leave the roll 252.

One method and means of severing the product from the flights 36 of tape is illustrated in FIGURE 14 associated with the guide drum or roll 44. The roll 44 is fashioned with peripheral grooves or recesses 390, one of which is shown in FIGURE 14, to accommodate the spaced flights 36 of the tape. Arranged adjacent the roll 44 is a shaft 392 journaled in suitable bearings or other supports (not shown). Mounted upon the shaft 392 are circular disc-like severing wheels 394, one of which is shown in FIGURE 14, the peripheral cutting edges of which engage the product at the region of the peripheral recesses or grooves 390 to sever the product.

As shown in FIGURE 14, the peripheral edge region of a cutting wheel extends into the adjacent recess in the drum 44. The shaft 392 and the cutting wheels 394 may be rotated by a suitable motor (not shown) to assist in effecting the severing operations. It is preferable to sever the product from the tape flights 36 in advance but adjacent the roll 44. After severing the unwoven product from the guides or tape flights, both the product and the tapes engage and move partially around the roll 44.

As the tape flights and product leave the roll 44, the tape flights move around the roll 46, as shown in FIGURE 1, to the fabric forming station where filamentary materials are again wound around the tape flights. The residual severed material remaining on the tape flights is scraped off or removed by any suitable means (not shown) and becomes waste. The end product may be collected in any suitable manner or conveyed to another station for further processing if desired.

In the embodiment illustrated in FIGURE 1, means is illustrated for collecting the product in a rolled package as it leaves the roll 44. Mounted upon one of the supporting struts or frame members 10 is a bracket 398 on which is journally supported a shaft 399 carrying a wheel 400, the periphery of which engages one face of one of the flights 36 of the tape 38. Also supported upon the strut 10 is a bracket 402 having a threaded bore accommodating a member 404.

Threadedly engaged with the member 404 is an adjustable member 406 provided with a shaft 407 on which is journaled a wheel 408 preferably fashioned with a peripheral groove which receives the flight 36 of the tape, the tape being in engagement with both wheels 400 and 408 at their nip regions. The bracket 406 carrying the wheel 408 is rendered adjustable by manipulation of the threaded member 404 whereby the roll 408 may be adjusted to exert pressure so that a drive is established for the roll 400 by the moving tape flight 36. Fixed upon the shaft 399 which supports the wheel 400 is a toothed sprocket 410.

Mounted upon the floor or other support is a bracket construction 412 journally supporting shafts 414 and 415. The shafts 414 and 415 carry rolls 416 and 417 respectively, the rolls being of a length equal to or greater than the width of the end product to be collected. The rolls 416 and 417 are positioned whereby the product is collected in a rolled package 420 supported by the rolls. The shaft 414 is equipped with a toothed sprocket 422, the sprockets 410 and 422 being connected together by a driving chain 424.

A bracket 426 provides means journally supporting a shaft 427 equipped with a guide roll 428 for guiding the product leaving the roll 44 to the product collecting station provided by rolls 416 and 417. The continuous movement of the tape 38 rotates the wheel 400, which rotation is transmitted by the driving chain 424 to the roll 416 thereby effecting collection of the product in a rolled package 420 through the frictional engagement of the product package with the peripheral surface of the driven roll 416. The roll 417 provides support for the product package and maintains engagement of the package with the driven roll 416.

Another method of severing the unwoven product from the flights 36 of the tape is illustrated in FIGURES 15 through 17. The principle or method of severing involved in the arrangement illustrated in FIGURES 15 through 17 resides in tilting or canting the tape flights 36 with respect to the plane of the multi-ply unwoven product 96 to accommodate severing instrumentalities. The severing of the product through this method should preferably take place in advance of the roll 44.

Arranged at each edge region of the product 96 for engagement with the fabric on the tape flights 36 are two pairs of rolls 432 and 434 for each tape flight, the rolls 432 being provided with tenon or shaft portions 436, and the rolls 434 provided with tenon or shaft portions 438, the tenon portions being journally mounted in suitable supports (not shown). The pairs of rolls are arranged as shown in FIGURES 15 and 16 at an angle to the plane of the product 96. As shown in FIGURE 16, the relative angular positions of the pairs of rolls 432 and 434 distort or deflect the tape flights 36 to the positions illustrated.

The pairs of rolls adjacent the tape flights are spaced lengthwise of the product, as shown in FIGURE 15, and between the sets of rolls the upper ply 96′ is slightly separated from the lower ply 96″ to form a shallow triangular space 442. Disposed between the pairs of rolls at each side of the product is an electrically energizable motor 444 or other suitable motive means, the shaft 445 of which is equipped with a severing or cutting wheel or disc 446, providing an instrumentality for severing the edge regions of the product between the plies.

Positioned adjacent each cutting instrumentality and projecting inwardly adjacent the inner edge of the adjacent tape flight 36 is a member or bar 448 angularly arranged with respect to the plane of the adjacent flight of the tape, as shown in FIGURE 17, to provide a triangularly shaped space or pocket 450 between the tape and the bar 448, the adjacent edge region of the product bridging the pocket 450.

The cutting instrumentality 446 is positioned so that the peripheral cutting edge severs the bridging portion of the ply of the product, the cutting edge extending a short distance into the pocket 450 to assure severing of the strands, yarns or other filamentary materials of the product whereby the multi-ply product 96 may thereafter be removed from engagement with the tape flights 36. This method eliminates any waste material. After the severing operation, the product 96 and tape flights 36 advance over the roll 44.

When the cutting method, illustrated in FIGURES 15 through 17, is employed, the tape guide wheels 46, shown in FIGURE 1, are spaced a greater distance apart than the normal width of the parallel flights 36 so as to cause divergent movement of the tape flights 36 between the roll 44 and the wheels 46 so as to withdraw the tape flights 36 from between the edge regions of the plies of the product 96 whereby the product becomes separated from the tapes for collection into a package or conveyed away for further processing.

Where this method of severing is employed, it is desirable that the axes of the tape guiding wheels 46 be positioned so that the plane of movement of the flights 36 between the roll 44 and the wheels 46 be substantially coincident with the plane of movement of the product between the roll 44 and the guide roll 428 so that there is a minimum of distortion of the plies of the product at the regions of disengagement from the tape flights.

While the binder applicators 138 are shown in FIGURE 12 for applying binder, if desired, onto the individual filamentary bodies such as strands, threads or yarns fashioned of glass fibers or filaments in advance of their being wrapped around the tape flights 36, binder may be applied at other stages or stations in the formation of the product. As shown in FIGURE 1, one or more binder applicators 139 may be employed to spray, deliver or disperse binder onto the product prior to its engagement with the endless conveyor 204 at the region of the drum or roll 40. It is to be understood that binder or coating material may be applied at other stations, if desired.

While the method and apparatus of the invention may be utilized as hereinafter explained and described in the production of many kinds or types of composite unwoven product of filamentary materials and binder, the operation of the arrangement, shown in FIGURE 1, for producing a dual layered or dual ply product 96 will now be described. More particularly the description of the operation is in reference to the production of the product illustrated at 96 in FIGURES 12 and 23 wherein two contiguous plies or layers of strand, threads or yarns of glass filaments or fibers are formed with the strands, threads or yarns of one layer in diagonal crossing relation with respect to those of the adjacent layer.

Referring initially to FIGURE 1 in the operation of the arrangement, the creel 24 is loaded or provided with spools, packages or cops of strand, threads or yarns, each package or cop 100 being supported upon an individual bar 104 in the manner shown in detail in FIGURE 11. The weight of the filamentary material on a cop or package telescoped over the spindle 108 effects a tilting of the spindle and the arm 100 to maintain the pin 114 engaged in a notch 112 on the bar 104 to prevent dislodgment of the cop.

As shown in FIGURE 11, the thread, yarn or other filamentary material 102 is unwound from the exterior of the cop. The creel is of a dimension to support upwards of several hundred pakages or cops of filamentary material to be used in fabricating the unwoven product. As shown in FIGURE 11, the threads, yarns or strands are each individually threaded through a nylon guide tube 130, certain of the tubes being configurated with a loop or convolution 134 to provide a degree of friction so that each thread, yarn, strand or filamentary body is under initial tension following its withdrawal from the cop or package.

Each filamentary body is engaged between guide pins 124 of the annular comb or guide member 120, shown in FIGURES 11 and 18, whereby the several hundred filamentary bodies are arranged for movement in a converging, generally cone-shaped path as shown in FIGURES 11, 12 and 18. The tape 38, being crossed at the region illustrated at 50, as shown in FIGURE 2, provides the spaced flights 36 which are guided in parallelism by circumferential grooves provided in the guide wheels 46, 48, 50 and 52.

Figure 24:
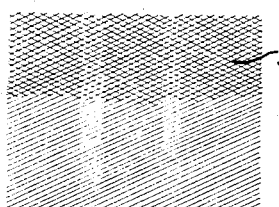
FIGURE 24 is a view similar to FIGURE 23 with the filamentary materials of the plies crossing at included angles greater than 90°.

The angularity of the crossing filamentary bodies in the product 96 in FIGURE 13 is determined by the ratio of rotative speeds of the creel 24 and the drum 40. If a more acute angularity of the crossing of the groups or plies of filamentary bodies is desired the flights 36 of the tape are advanced at an increased speed as compared with the rotative speed of the creel 24. If a more obtuse inclination or angularity for the plies of filamentary bodies is desired, such as shown in FIGURE 24, the speed of the creel is increased with respect to the rate of linear travel or speed of the tape flights 36.

As hereinbefore mentioned, binder may be applied to the filamentary bodies at the region indicated in FIGURE 12 before the group is engaged with the tape flights 36. Binder or coating material may be applied or additional binder or coating material applied by the applicators 139 during or after the winding of the filamentary bodies in crossing relation is effected on the tape flights 36.

As the unit 286, including the roll 300, the arms 287 and components carried thereby, is supported by the belt conveyor 204, the conveyor 204 and the tape flights are driven by the drum 40. As the formed multi-ply web or product 96 is conveyed upwardly, as viewed in FIGURE 1, and into engagement with the outer surface of the belt conveyor 204, the binder or coating material is set or thermally conditioned by the application of heat in the drum 40 by the heating units 366.

The product 96 formed on the tape flights 36 is held in close relation with the surface of the conveyor 204 under the influence of the flexible belt guide means 386, which is likewise driven by frictional contact of the belt 386 with the product on the surface of the conveyor 204. The guide belt 386 holds the binder laden, multi-ply product in close contact with the conveyor surface to promote the effective transfer of heat to the product to set the binder. The binder in the product may be of the thermoplastic or thermosetting type.

The application of heat disperses the binder or other material throughout the area of the unwoven product 96, the heat causing migration of the binder toward the heated conveyor effecting an appreciable concentration adjacent one face of the product which promotes a smooth finish on one surface. The product is conveyed by the conveyor 204 beneath the roll 300, the roll 300 being cooled by circulating cooling fluid to accelerate transfer of heat away from the product.

The position of the drum or roll 334 with respect to the roll 300 is determined by the abutment screw 344 which is adjusted to a position to control and determine the thickness of the product through the coordination of the rolls 300 and 334. The tape flights 36 bearing the product 96 wound thereon, move away from the rolls 300 and 334 in a right-hand direction as viewed in FIGURE 3. At the region of the roll 252, the endless belt conveyor 204 passes partially around the roll whereby the return flight thereof engages the periphery of the roll or dum 40.

The tape flights 36 convey the product 96 in a right-hand direction to a severing station at which the means shown in FIGURE 14, or the means shown in FIGURES 15 through 17, severs the product 96 from the tape flights. If the severing arrangement of FIGURE 14 is employed, the rotating cutting disc 394 engages the unwoven product 96 at the region of the peripheral grooves 390 to sever both plies or layers of the product adjacent the tape flights thus forming a continuous sheet, web or strip of unwoven textile 96 in which the crossing threads, yarns or filamentary bodies are integrated by the binder, the product being of uniform thickness by reason of the sizing step effected by the rolls 300 and 334.

After severing the product from the supporting tape flights 36, the tape flights move around the roll 46 for return to the product forming or winding station adjacent the creel. In the use of the product severing method and means of FIGURES 15 through 17, the severing action is preferably performed just in advance of the roll 44. The product severed from the tape flights 36 moves around the roll 428 to be collected in roll package form 420 shown in FIGURE 1.

The residual material on the tape flights after a severing operation is performed by the means illustrated in FIGURE 14 may be removed by a doctor blade, scraper or other conventional means (not shown). Through the arrangement of crossing the continuous single element, tape or band 38, the flights 36 move at identical speeds and thus require no coordination of speed such as would be necessary with separately driven flights.

Each of the flights 36 of the tape 38 is maintained in its defined path of movement relative to the adjacent parallel tape under the influence of the guide arrangement illustrated in FIGURES 8 and 9 and hereinbefore described. Through the arrangement of automatic tape guiding means, shown in FIGURES 8 and 9, the flights 36 of the tape are not affected by the tension of winding of the group of filamentary materials on the tape flights so that there is no appreciable variation in the dimension between the tape flights and hence no looseness is encountered of the filamentary materials supported on the tape flights.

The tension in the tape 38 may be regulated by adjusting the nuts 92 along the threaded portions 88 of member 86 which controls the position of the pivoted frame 54 and thereby shifts the relative position of the tape guide wheels 46.

The method of the invention and the apparatus are adaptable for fabricating various products wherein the unwoven fabric may be laminated or assembled with one or more sheets, webs or layers or other materials or provided with a backing layer or facing layer depending upon the end use for the composite product. FIGURE 22 illustrates the adaptation of the arrangement shown in FIGURE 1 utilized for making various forms of unwoven product. For example, the unwoven fabric may be laminated at the time of formation of the fabric or subsequently thereto with sheet, web, foil or other material.

As shown in FIGURE 22, the creel 24', drum 40', conveyor 204', the frame 212' and components carried thereby and the conveyor tape 38 for establishing the parallel conveyor flights 36 are of the same construction shown in FIGURE 1. When it is desired to produce a composite product wherein a web, sheet, foil or other medium is to be embodied with or between the multi-plies of the unwoven fabric or textile, the apparatus may be utilized in the following manner: Arranged beneath the creel 24' is a supply roll 455 of sheet material carried by a shaft or core 456 supported upon a suitable frame (not shown) in a conventional manner.

The sheet, laminating material or medium 458 from the roll 455 may be foil, webbing, felt, paper, textile, an elastomer, resinous plastic or other strip material depending upon the end use of the product. Arranged adjacent the supply roll 455 is a pair of guide rolls 460 which are preferably disposed so that the nip region of the rolls is in a vertical plane of the tape flights 36 passing through the center of the creel 24'. The sheet, web or strip 458 is threaded upwardly through the nip of the rolls 460 in a plane of the major surfaces of the tape flights 36 and between the tape flights.

The sheet or medium 458 is drawn upwardly with the tapes due to engagement of the product with the conveyor 204' and the hold-down conveyor 386 or a conveyor 520 hereinafter described. The yarns or filamentary bodies 102 are wound around the tapes by rotation of the creel 24', the latter carrying the packages of filamentary bodies or materials as shown in FIGURE 1. Binder applicators 462 may be employed to apply or distribute binder or binding agent 463 onto the yarns or filamentary bodies 102, as shown in FIGURE 20.

The assemblage of the sheet or medium 458 and the threads 102' wrapped around the tape flights 36 moves into engaging relation with the conveyor 204 adjacent the periphery of the drum 40'. The binder may be cured or set through the heated environment provide by the heating elements within the drum 40'. The composite product of sheet 458 and the multi-ply body of filamentary materials 102 is conveyed by the conveyor 204' beneath the roll 300' and to a severing means, such as that shown in FIGURE 14, or that illustrated in FIGURES 15 through 17, at which station the assemblage of sheet 458 and unwoven fabric is severed from the tape flights 36.

The composite product is conveyed to the package collecting station and the material rolled into a package 459 in the same manner as hereinbefore described in reference to FIGURE 1. The product produced in this manner is shown at 461 in FIGURE 27. The same general method may be employed to produce a multi-ply unit which, at the severing station, may be separated to provide two end products of identical construction comprising a sheet or web faced on one side with a single layer or ply of diagonally arranged filamentary bodies as shown in FIGURE 26.

Figure 26:
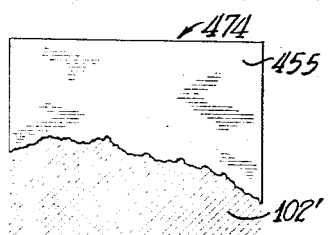
FIGURE 26 is a view of a portion of sheet material reinforced with an unwoven web of diagonally arranged yarns or filamentary materials.
Figure 27:
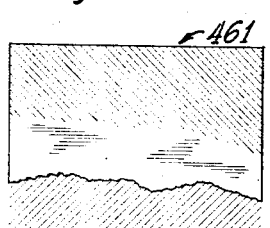
FIGURE 27 is a view illustrating a foil or other sheet material laminated with an unwoven web of diagonally arranged yarns or filamentary materials on opposite sides of the foil or sheet.

With particular reference to FIGURE 22, in producing the form of product, shown in FIGURE 26, a second sheet, web, foil or other strip material 472 from a supply roll 470 is fed upwardly in contiguous relation with the sheet 458 and the tape flights 36. The filamentary bodies or yarns 102', under the influence of rotation of the creel 24' are wound about the tape flights and the two contiguous sheets 458 and 472, the sheets or strips 458 and 472 being of a width not exceeding the distance between the outermost edges of the tape flights 36.

Binder is applied by the applicators 462 preferably at the region shown in FIGURE 22. It will be noted that there is no binder applied between the contiguous sheets 458 and 472. The assemblage of sheets 458, 472 and the yarns or filamentary bodies 102' oriented in the pattern of unwoven fabric 96 is advanced and engaged with the conveyor 204' at the region of tangency of the conveyor with the drum 40'.

The heating units within the drum 40' supply heat to thermally set or cure the binder between the outer surface of each sheet and the adjacent layer of filamentary bodies 102 to secure the filamentary bodies of each layer to the adjacent sheet, but the contiguous sheets 458 and 472 are not bonded together. The composite assemblage is advanced by the conveyor 204' to a severing station at which the material is severed from the tape flights 36.

The severing of the edge regions of the assemblage results in two separate end products or units 474, one of which is shown in FIGURE 26, each unit comprising a sheet faced on one side with a single layer of diagonally arranged threads 102'. The arrangement shown in FIGURES 1 and 22 may, through the use of accessory arrangements, be utilized to produce a product comprising strands, threads, yarns or other filamentary bodies arranged in parallel relation and provided with bonding agent having thermoplastic characteristics whereby the bonding agent may, during further processing operations, be treated to adhere the product with other components.

When a product of this character is to be fabricated through the use of the apparatus shown in FIGURE 22, a guide means for parallel filamentary bodies is provided comprising bars 478 and 479 arranged in parallel relation as shown in FIGURES 19 and 22, the bars being held in spaced relation by a plurality of pins or members 480 in spaced relation by connecting the bars in the manner shown in FIGURE 19. The connecting pins 480 also provide means for spacing the filamentary bodies 482 in the manner shown in FIGURE 19.

The filamentary bodies, strands or yarns 482 are obtained from a plurality of packages of these materials mounted upon a suitable stationary creel or support in a conventional manner (not shown). The filamentary bodies 482 are fed or drawn upwardly between guide rolls or bars 460, the rolls 460 being adapted to converge the filamentary bodies 482 into a single plane in spaced parallel relation.

One or more applicators 486 may be disposed adjacent the assemblage or group of parallel filamentary bodies for delivering or dispersing binder at random on the parallel bodies of the groups so that the binder contacting the threads or bodies is preferably in the form of globules or particles 488. The assemblage of parallel bodies and particles or globules of binder is engaged with the conveyor 204' whereby the binder is dispersed to a limited extent over the pattern of parallel bodies and set to maintain the bodies in parallel orientation.

In the formation of this product, the parallel filamentary bodies are not engaged with the flights 36 of the metal tape. The product is conveyed by the conveyor 204' to the guide roll 44' without the necessity of a severing operation. The product may be collected in package form in the manner hereinbefore described in connection with FIGURE 1. The product fashioned by this method may be used as a vehicle or carrier for binder or adhesive for laminating other plies or layers of material together. The end product of parallel bodies and binder is illustrated at 490 in FIGURE 33 comprising the group of parallel arranged filamentary bodies 482 and the random orientation of patches of binder or integrating agent 488.

A composite product or unwoven fabric may be fashioned by combining the diagonally wound filamentary materials 102' with a group of spaced parallel filamentary bodies 484, shown in FIGURE 19. In producing such product, the filamentary bodies 482 are guided in the same manner as shown in FIGURE 19, the group 484 being disposed between the tape flights 36 and in a single plane.

Binder may be applied by applicators 462 to the parallel bodies in the pattern or goup 484 and the filamentary materials 102' at the region indicated in FIGURE 22. If desired, binder may be applied or additional binder applied at a region above the assembly of the filamentary bodies 102' with the tape flights and the bodies 482. The assembly of parallel filamentary bodies 484 and the plies of filamentary materials 102' arranged in diagonal relation is advanced into engagement with the conveyor 204 shown in FIGURE 4, or the conveyor 204', shown in FIGURE 22.

Where the assemblage is engaged with the conveyor 204, it is advanced by the conveyor beneath the endless hold-down belt 386, shown in FIGURE 3, which exerts pressure upon the assemblage to hold the plies of filamentary materials 102' and the bodies 482 in compact relation. As the assemblage is moved adjacent the drum 40, the binder may be thermally treated through the application of heat from the heating elements contained within the drum 40 in the manner hereinbefore described.

Figure 25:
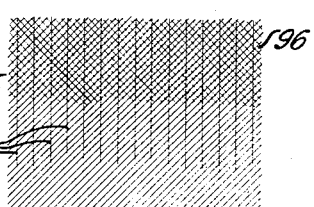
FIGURE 25 illustrates an unwoven scrim fabric similar to FIGURE 23 provided with parallel reinforcing yarns or filamentary bodies.

The product is advanced by the conveyor 204 into engagement with the roll 300. As the roll is cooled by circulating cooling fluid, heat is withdrawn from the product by the circulating cooling fluid. The resulting product may then be severed from the tape flights by the severing means illustrated in FIGURE 14, or the severing means illustrated in FIGURES 15 through 17 in order to effect a separation of the product from the tape flights 36. The end product 494 produced by this method and illustrated in FIGURE 25 provides exceptional strength lengthwise of the product in addition to the strength characteristics provided through the bonding of the junctions of the diagonally arranged filamentary materials of the overlapping plies illustrated at 96.

Figure 33:
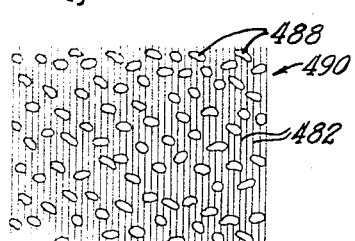
FIGURE 33 is a plan view of an unwoven web of parallel strands or yarns in spaced relation integrated by flecks or patches of binder in random pattern or disposition.

FIGURES 20 and 21 illustrate a modified form of guide means 498 for directing filamentary bodies in parallel relation to produce a product of the general character illustrated in FIGURES 19 and 33. The guide means includes members 500 of veneer or metal preferably of planar shape with an element 502 disposed between the members 500 and being of corrugated or undulated shape, as illustrated. The plate-like members 500 may be bonded or adhered to the corrugated member 502 by suitable adhesive or glue applied between the peaks of the undulations and the adjacent inner surfaces of members 500.

The undulations of element 502 provides spaces into which are fitted comparatively small tubes 504 fashioned of nylon (polyamide resin) or other suitable resinous plastic material. Each nylon tube 504 accommodates a filamentary body, the bodies being obtained from packages mounted on a suitable creel or support (not shown). The guide means 498 may be disposed beneath the creel 24 and in the plane of vertical movement of the tape flight 36 whereby the filamentary bodies move vertically through the guide tubes 504 into engagement with the conveyor 204 or 204'.

The guide tubes 504 may be cemented or otherwise fixedly secured in the spaces provided by the undulated member 502. While the guide tubes 504 are shown in equally spaced relation, they may be spaced at unequal distances depending upon the pattern of filamentary bodies desired to be formed.

The method of the invention is particularly adaptable for concomitantly forming the unwoven fabric or textile and laminating the same with various sheet-like or web-like materials such as metal foil, resinous elastomers, natural or synthetic rubbers, paper, flake-glass resin sheets or other sheet or web materials of similar character. The unwoven fabric may be faced on one or both sides with a web or sheet material.

When a reinforced laminated product of the character above mentioned is to be produced, additional conveyor means is preferably employed in association with the drum 40 or 40' and the tension roll 300 or 300', such modified arrangement being illustrated in FIGURE 22. Secured to pads 506 carried by the frame 212 are members 508, each of the members having parallel portions providing ways or tracks to accommodate bearing blocks or journal members 510. The members 510 are slidable along the ways provided by the members 508. Each of the bearing blocks 510 is bored to journally support a rotatable shaft 511, a roll 512 being mounted upon the shaft 511.

Secured to the opposite end regions of the parallel members of the frame 212' are bearing blocks or journal members 514 which are secured to the frame members. The bearing blocks 514 journally support a rotatable shaft 516 upon which is mounted a roll 518. An endless belt-type conveyor 520 of the same type as belt 204' is supported by rolls 512 and 518, the conveyor 520 being contiguous with the conveyor 204' from the region of the drum 40' to the region of the roll 518. The roll 512 is fabricated of metal and, by reason of its mounting in the slidable bearing blocks 510, the weight of roll 512 exerts substantial tension in the conveyor 520 to maintain the conveyor in a taut condition.

As previously mentioned, the unwoven fabric being fashioned on the tape flights 36 may be laminated with strip material. As shown in FIGURE 22, a roll or supply 522 of strip material is mounted on conventional supporting means (not shown) and is adapted to be laminated with the unwoven fabric. The strip or sheet material 524 from the supply roll 522 is threaded upwardly into engagement with the conveyor 204' and the newly formed unwoven fabric moves into contiguous relation with the strip 524.

In laminating strip, web or sheet material with the unwoven fabric, it is desirable to add additional binder or bonding agent to the unwoven fabric or apply the binder after the filamentary materials are wound about the tape flights to form the unwoven fabric. As shown in FIGURE 22, an alternate means of applying adhesive, binder or bonding agent to the unwoven fabric is illustrated at 528. This form of binder application involves the use of two elongated receptacles 530 in which are journaled binder carriers 532 in the form of rolls partially immersed in liquid binder or bonding agent contained in the receptacles 530.

Disposed in rolling contact with the rolls 530 are applicator rolls 534 which engage both major surfaces of the unwoven fabric as it moves upwardly into contact with the strip, sheet or web 524. The rolls 532 immersed in bonding agent acquire a coating or film of the agent which is transferred by surface or wiping contact to the rolls 534 thence onto the unwoven fabric 96. The strip or sheet 524 is engaged by the binder-laden unwoven fabric and is moved between the conveyors 204' and 520 and around a portion of the periphery of the drum 40'.

Heat may be applied through the drum 40' to set or cure the binder to adhere or join the strip 524 and the fabric 96. The assemblage of strip and unwoven fabric is conveyed between the flights of conveyors 204' and 520 beneath the roll 300'. Cooling fluid circulating through the jacket means in the drum 300' withdraws heat from the assemblage.

The thickness of the laminated product may be sized by the arrangement shown at 322 and hereinbefore described in connection with the construction shown in FIGURE 3 wherein the position of the sizing roll 334 is adjustable to determine the thickness of the laminated product. A severing means of the character hereinbefore described of the form shown in FIGURE 14 or the form shown in FIGURES 15 through 17 may be employed for the purpose to effect separation of the product from the tape flights 36. Binder may be applied in forming this type of product by an applicator 536, shown in FIGURE 22, adjacent the region of engagement of the fabric component 96 with the strip material 524.

The method of the invention may be employed for providing a web, strip or sheet material as a facing for both sides of the unwoven fabric. To produce a laminated product of this character, a second roll or supply 538 of material such as a web, sheet or foil is disposed in the position shown in FIGURE 22 and supported by conventional means (not shown). The strip, web or sheet 540 from the roll 538 is engaged with the unwoven fabric component 96 at the region of tangency of the strip 540 with the conveyor 204' at the peripheral region of the drum 40'.

When strips 524 and 540 are applied to the respective faces of the unwoven fabric 96, it is preferable to apply the binder or bonding agent by means of the applicator rolls 534 which are supplied with the binder or bonding agent from the receptacles 530 so that both plies of filamentary materials of the unwoven fabric will be provided with an ample quantity of binder to adhere the strips 524 and 540 to the fabric. The composite product of this character is advanced between the belt conveyors 204' and 520 and heat applied to the product by the heating elements in the drum 40′ to cure or thermally treat the binder.

Figure 28:
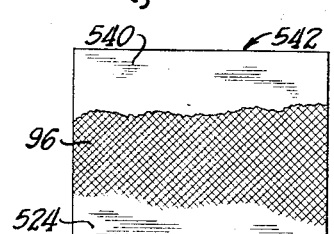
FIGURE 28 illustrates an unwoven web or fabric of the invention embedded between sheet materials.

As the roll 512 is journaled in blocks 510 slidably supported in the ways provided by the member 508 substantial tension is established in the conveyor 520, which together with the tension in the conveyor 204′ provides effective pressure to securely bond or join the facing webs, sheets or strips 524 and 540 to the fabric 96 which is embedded or enclosed within the webs, strips or sheets. The thickness of the end product may be sized through the use of the unit 322 associated with the roll 300′ so as to provide a product having a uniform thickness. The product produced by this method is indicated at 542 in FIGURE 28 comprising the unwoven fabric component 96, a facing strip 524 at one side and the facing strip 540 at the opposite side, the binder integrating these components into a unitary product.

Figure 29:
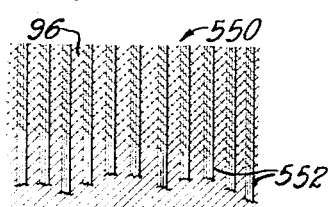
FIGURE 29 illustrates a nonwoven fabric having a ply or layer of diagonally crossing strands of yarns at each side of a core of parallel rovings.

FIGURE 29 is illustrative of a product 550 comprising the fabric component 96 of crossing strands, threads or yarns formed by winding the same about the tape flights 36 and orienting therewith a plurality of groups of strands, yarns, threads or rovings 552, the groups being arranged in spaced relation. The groups of strands, yarns or rovings 552 may be oriented in spaced parallel relation between the tape flights 36 by guide means of the character shown in FIGURE 19.

In promoting the pattern of spaced groups of rovings, threads or yarns 552, shown in FIGURE 29, several strands, yarns, threads or rovings are fed through alternate openings between adjacent pins 480, shown in FIGURE 19, to establish the spacing between each group of strands, yarns, threads or rovings. The lateral spacing of the groups may be modified by changing the positions of the pins 480 to secure any desired spacing.

Uneven spacing of the groups may be obtained simply by changing the position of the guide pins 480. In the product 550, shown in FIGURE 29, the groups 552 are conveyed upwardly between the tape flights 36 and the filamentary materials providing the component 96 are wound about the tape flights and the groups 552.

Figure 30:
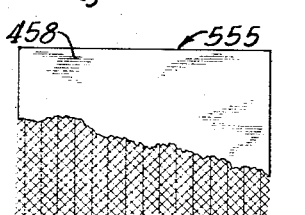
FIGURE 30 illustrates sheet material reinforced with unwoven fabric of diagonally arranged strands or yarns and parallel reinforcing yarns.

FIGURE 30 illustrates a product designated 555 comprising the unwoven fabric component 96 in which is incorporated spaced parallel strands, yarns or threads 482 and a strip of sheet material 455 applied as a facing to one side of the component provided by the fabric 96 and the parallel strands, yarns or threads 482. This arrangement is produced on the apparatus shown in FIGURE 22 wherein the strands, yarns or threads 482 in spaced parallel relation are advanced upwardly through the guide means 480, shown in FIGURE 19, the strip 458 obtained from the supply roll 455, and binder or bonding agent applied by any of the applicators at the positions shown in FIGURE 22.

Figure 31:
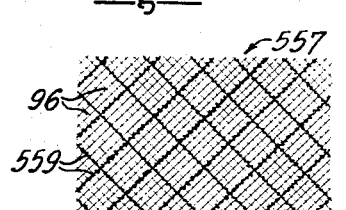
FIGURE 31 illustrates a scrim-like unwoven fabric of plies of diagonally crossing strands or yarns containing spaced colored or decorative yarns.

FIGURE 31 is illustrative of an unwoven textile product 557 in which the unwoven textile 96 is fashioned at spaced intervals with decorative or colored yarns, strands or rovings 559. In fabricating this form of product, the filamentary materials of certain packages 100 carried by the creel 24 are colored, or colored rovings may be embodied in the pattern or orientation or decorative motif illustrated in FIGURE 31.

Figure 32:
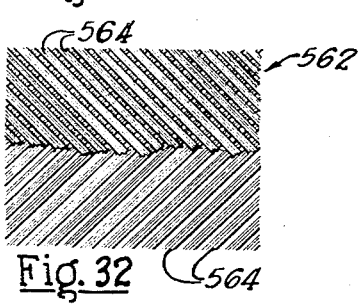
FIGURE 32 illustrates an unwoven fabric similar to FIGURE 23 fashioned of rovings.

FIGURE 32 is illustrative of another form of product 562 wherein the threads, yarns, strands or rovings are spaced in groups 564 arranged in diagonal crossing relation. The grouping of the filamentary materials in the orientation or pattern illustrated in FIGURE 29 may be attained by modifying the positions of the guide openings 124, shown in FIGURE 11 or the spacers shown in FIGURE 18, and bunching the yarns or strands into groups between adjacent guides arranged in desired spaced relation or directing several strands, threads or yarns between alternate guides throughout the circumference of the guide ring 120. The product 562 is formed by winding the spaced groups 564 about the tape flights 36 in the manner hereinbefore described.

Figure 34:
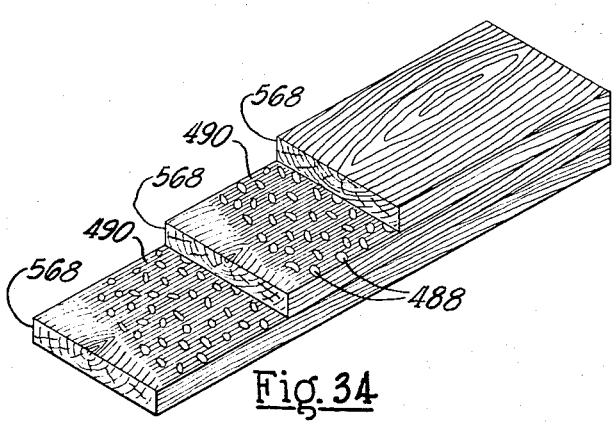
FIGURE 34 illustrates a multi-ply plank construction laminated with unwoven webs of the character shown in FIGURE 33.

The product 490, shown in FIGURE 33, is particularly usable for laminating wood planks together to form a laminated beam or laminating wood veneer to produce plywood. As shown in FIGURE 34, three wood planks 568 are disposed in contiguous relation with a binder-laden unwoven fabric product 490 between adjacent planks. In fashioning a beam providing multi-plies or layers of planks, the planks and unwoven fabric product 490 are assembled and pressure and heat applied to disperse the patches or particles of binder 488 over the adjacent surfaces of the planks and set the binder.

Thus the unwoven fabric provides an excellent vehicle or carrier for the bonding agent or binder 488 so that the binder is substantially uniformally distributed or dispersed throughout the entire contiguous adjacent areas of the planks 568. Through the provision of uniform distribution of binder between adjacent planks, the planks are joined or bonded together throughout their entire areas.

Figure 23:
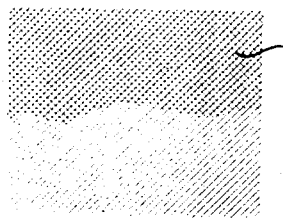
FIGURE 23 is a plan view of an unwoven scrim-like material formed by the method on the apparatus of the invention wherein the linear fibrous or filamentary bodies of the plies are diagonally arranged at about 45° relative to longitudinal axis.

FIGURE 35 illustrates a method of forming a product utilizing the unwoven product 96, as shown in FIGURE 23, as a surfacing for wood veneer. With reference to FIGURE 35, the wood veneer core 575 is faced exteriorly with the unwoven binder-laden product 96, the fabric-faced veneer 575 bent to the desired shape, and an inner surface layer 577 of unwoven fabric applied. In FIGURE 35, the cross-sectional configuration provides a product adapted for use as a gutter or drain for roofs as a substitute for the conventional metal type drain.

Another product which may be fashioned from wood veneer or the like reinforced with a binder-laden unwoven fabric is illustrated in FIGURES 36 through 38. In the product illustrated in these figures, the veneer core 580 while in a planar condition with a binder-laden unwoven fabric 582 bonded thereto, is scored, scarfed or notched as at 584 by a suitable tool 585, the score regions 584, shown in FIGURE 37, being in a rectangular pattern.

The extensions 581 may then be bent or hinged upwardly to form a rectangular shaped configuration or receptacle 588 shown in FIGURE 38. After fabrication of the veneer member 580 with the unwoven fabric 582 bonded thereto bent to the configuration shown at 588, the inner surfaces of the configuration 588 may be faced with a binder-laden unwoven fabric 590 and heat and pressure applied to securely bond the unwoven fabric layer 590 to the inner surface of the wood veneer receptable 588.

It is to be understood that other shapes and designs of articles may be fashioned embodying the unwoven fabric component hereinbefore described made according to the method disclosed and that the configurations shown in FIGURES 35 through 38 are illustrative of typical shapes that may be fashioned utilizing the method and product of the invention.

FIGURE 13 illustrates the adaptation of the apparatus of FIGURES 1 or 22 for utilizing rovings in the fabrication or production of the unwoven product of the invention. FIGURE 13 illustrates the creel 24a arranged to support roll packages of rovings, the rovings being adapted to be wound about the tape flights 36a. The platform portion 28a of the creel 24a supports an annular plate 122a to which is secured an annular member 594, the lower edge region of which is provided with teeth forming circumferentially arranged spaces 596 through which rovings 598 are threaded to properly space the rovings preparatory to their being wound around the tape flights 36a.

Rovings are initially collected in comparatively large diameter roll packages, as illustrated at 600 in FIGURE 13, the packages being coreless and the paying out, withdrawing or unwinding of the roving being effected from the inside of the package. In order to support the packages 600 upon the creel 24a, the bobbin or spool supports comprising the members 110 carrying the bobbin spindles 108 are removed from the arms 104, the arms being fixedly secured to the cylindrical wall of the creel 24a.

The packages 600 of rovings are supported by the bars 104, the bars 104 being spaced sufficiently close whereby each pair of bars 104 supports a package of roving. The rovings at regions intermediate the grommets 602 in the walls of the creel and the roving spacing member 594 are supported by an annular ring 604 mounted upon suitable supports 606 depending from the platform portion 28a of the creel. The apparatus illustrated in FIGURE 1 is modified to form unwoven textile of rovings as illustrated in FIGURE 13, the components of the apparatus operating in the same manner as hereinbefore described in respect of the form of apparatus shown in FIGURE 1.

As rovings are of comparatively large bulk, there is usually a lesser number of rovings employed in producing the unwoven fabric than yarns, strands or threads. Binder may be applied to the rovings by applicators hereinbefore described and the binder cured by heat applied at the region of the drum 40, the fabric formed of the rovings traversing the same path as hereinbefore described.

The method of the invention and the apparatus for carrying out the method is adaptable for producing unwoven fabric of layers or plies of filamentary materials in diagonally crossing relation as indicated at 96 wherein the angularity may be readily changed or modified through the variable speed drive contained in the housing 152 shown in FIGURE 7 to thereby vary the rate of rotation of the creel with respect to the rate of advancement of the tape flights 36.

The tape flights may be advanced at a speed whereby the crossing angles of the filamentary materials of the contiguous plies may be 90°, as illustrated in FIGURE 23. If the tape flights 36 are advanced at a lesser speed with respect to the rotation of the creel, the angles of crossing of the filamentary materials of the respective plies will be more obtuse as shown at 96' in FIGURE 24. If the tape flights 36 are advanced at a speed greater than the relative winding speed of the filamentary materials about the tapes, the crossing angles of the filamentary materials will be more acute or less than 90°.

It is found that the crossing or included angles of the filamentary materials in fashioning a dual layer or ply of unwoven fabric may be between approximately 30° and 130°. Through this varying angularity, the strength characteristics of the product in various directions may be modified for most efficient use of the product for which it is intended. It is to be understood that if the tape flights 36 are advanced at a comparatively slow rate and the winding of the filamentary materials about the tape flights carried on at a comparatively high rate of rotation, the included angles of the crossing filamentary materials approach a straight angle and that an unwoven fabric having more than two plies or layers of the filamentary materials may be formed if desired. Hence, depending upon the angularity or pitch of winding of the materials about the tape flights and the width of the group of filamentary materials collected thereon, a substantial number of unwoven plies may be superposed by the method.

The conveyors 204, 204', the hold-down belt or means 386 and the conveyor 520 are all driven through frictional inter-engagement by the drum 40 or 40'. If it is desired to establish controlled tension in the rovings the individual rovings may be passed through plastic tubes of the character illustrated in FIGURE 11 where the tubes are employed to establish tension in the threads, yarns or strands withdrawn from the cops 100.

The number of strands, yarns or threads that may be wound around the tape flights 36 in forming the unwoven fabric may be varied within wide limits. It has been found that as few as four strands and upwards of more than one hundred strands, yarns or threads per inch width may be utilized depending upon the size or type of yarn or strand utilized and the strength characteristics desired in various directions.

Various types of resin, adhesive or bonding agent or medium may be employed in the nonwoven or unwoven fabric for adhering the strands, yarns, threads or rovings together at their crossing junctions. Thermosetting or thermoplastic resins or adhesives may be employed depending upon the end use for the product. It has been found preferable for most end products to utilize thermosetting resins as they are substantially uneffected by application of heat in further processing operations.

Polyester resins have been found to be satisfactory for many end uses for the product. The percentage of binder, resin or adhesive is a factor affecting the characteristics of the end product. It is found that the percentage of resin or adhesive by weight to the fabric may be as low as 3% or upwards of 60%. The use of a low percentage of binder provides a loose material having low strength characteristics but endowed with considerable drapability.

Binder in the range of 5% to 10% provides good adhesion. Higher percentages of binder may be employed where semi-rigid panel-like products are desired. As the binder delivered onto the product is subjected to the application of heat at the drum 40 or 40', the resin or adhesive tends to migrate toward the heated surface or the source of heat. Where substantial amount of binder is present in the product, the surface or face of the product adjacent the application of heat will have a smooth continuity of surface area as contrasted with the opposite face of the product from which the binder has partially migrated toward the heated surface.

The product may be impregnated with B-stage epoxy thermosetting resins where the product is produced for molding purposes or for laminating with plywood or similar applications. The unwoven fabric may be impregnated with an acrylonitrile elastomer, polyurethane resins, polyisobutylene or the like for particular uses. The product may be laminated with various and diverse materials. For example, dielectric laminates may be fashioned by adhering glass-flake resin papers or sheets to the unwoven textile or fabric.

Such a laminate may be made by feeding a glass-flake resin admix from a supply onto the nonwoven fabric. The composite may then be passed between conveyor belts and the excess resin utilized to bond the junctures of the filamentary bodies of the fabric and the binder simultaneously cured in both the fabric and the flake-resin component to form a laminate. As previously described in connection with FIGURES 33 through 38, the nonwoven product may be employed as an adhesive carrier for laminating planks together, for laminating wood veneer, for facing products of veneer, or for facing products such as those shown in FIGURES 35 and 38.

The fabric may be incorporated with other sheet, foil or web materials by impregnating, coating or laminating. The unwoven fabric per se may be utilized as reinforcement, particularly for plastics and for stiffening panels. The fabric may be formed with various colored strands, threads, yarns or rovings whereby to impart a decorative motif or color to the product. It is found that embodying or reinforcing plywood with the nonwoven fabric product of the invention that the tensile strength and rigidity of the plywood are greatly improved.

The product may be fabricated by winding the filamentary materials or bodies about sheet materials such as paper, foils, resin films, flake-glass sheet or flake-glass resin papers, natural or synthetic rubbers. The nonwoven fabric may be laminated with any sheet materials after the fabric has been formed. The nonwoven fabric, in itself, may be processed to provide the equivalent of a varnished cambric by the inclusion of a polyester resin in the fabric.

The apparatus of the invention may be associated with other apparatus for performing additional processing or laminating operations so that a continuous "in line" production of various products may be attained.

The method of the invention may be employed for fashioning flat conductor flexible insulated cables. In producing products of this character, one or more metal conductors are advanced upwardly through the central region of the creel and the filamentary bodies of glass filaments or fibers, such as strands or yarns or rovings, are wound around the metal conductors and a suitable resin or varnish delivered onto the unwoven textile or web. If desired, the conductors may be precoated and the nonwoven web or fabric impregnated with a resin compatible with the precoating resin on the conductors.

From the foregoing it will be apparent that various novel products may be fashioned or produced utilizing the novel method of the invention, and the examples of products herein described or referred to are typical examples illustrative of products that may be made by the method, the specific examples being for purposes of illustration and not of limitation.

It is apparent that, within the scope of the invention, modifications and different arrangements may be made other than as herein disclosed, and the present disclosure is illustrative merely, the invention comprehending all variations thereof.

I claim:

1. Apparatus of the character disclosed, in combination, means arranged to support a plurality of packages of filamentary bodies, guide means for orienting the filamentary bodies in spaced relation as the bodies are withdrawn from the packages, means for delivering binder onto the filamentary bodies, continuously moving conveyor means arranged to withdraw the filamentary bodies from the packages, means for heat treating the binder on the filamentary bodies, a cylindrical member engaged by said conveyor means, said cylindrical member having a chamber therein accommodating circulating heat-absorbing fluid for transferring heat from the assemblage of filamentary bodies and binder.

2. Apparatus of the character disclosed, in combination, means arranged to support a plurality of packages of filamentary bodies, guide means for orienting the filamentary bodies in spaced relation as the bodies are withdrawn from the packages, applicator means for delivering binder onto the filamentary bodies, continuously moving conveyor means arranged to engage and advance the binder-laden filamentary bodies, means for treating the binder, and roll means for sizing the assemblage of filamentary bodies and binder to a predetermined thickness.

3. Apparatus for forming webs of filamentary materials including, in combination, means supporting packages of filamentary bodies, guide means arranged to orient the bodies in adjacent closely spaced relation, a first cylindrical member, an endless conveyor engaging said member, said bodies engaging said conveyor, means for applying an adhesive material to the bodies, means associated with said first cylindrical member for heat treating the material on the bodies, a second cylindrical member arranged to be engaged by said conveyor, and means associated with said second member for transferring heat away from the material on the bodies.

4. Apparatus of the character disclosed, in combination, a pair of spaced rolls, an endless sheet metal belt conveyor supported by said rolls, a tension unit disposed between the rolls, said tension unit including a cylindrical member engageable with the conveyor belt, means for moving said conveyor to advance an assemblage of unwoven filamentary bodies and binder to the region of one of said rolls, means for applying heat to set the binder in the assemblage of filamentary bodies and binder, means for sizing the thickness of the assemblage including a sizing roll carried by said tension unit, and means for adjusting the relative position of the sizing roll.

5. Apparatus of the character disclosed, in combination, a rotatable creel arranged to support a plurality of packages of filamentary material, a drum, a single endless flexible metal tape arranged to provide spaced parallel flights of the tape, guide means for maintaining said flights in substantial parallelism, means for rotating said drum to advance the flights of tape in the same direction, and means for concomitantly rotating said creel to effect a winding of the filamentary materials from the packages around the parallel flights of the tape.

6. Apparatus of the character disclosed, in combination, a rotatable creel arranged to support a plurality of packages of filamentary bodies, a drum, a single endless flexible metal tape arranged to provide spaced parallel flights, guide means for maintaining said flights in substantial parallelism, means for rotating the drum to advance the flights of the tape in the same direction, means for concomitantly rotating said creel to effect a winding of the filamentary bodies from the packages around the flights of the tape, means for applying a bonding agent to the filamentary bodies, means associated with the drum for treating the bonding agent, said tape advancing at a rate whereby the angularity of deposition of the bodies on the tape flights forms an unwoven product, said bonding agent maintaining the filamentary bodies of the product in crossing relation.

7. Apparatus of the character disclosed, in combination, a rotatable creel arranged to support a plurality of packages of filamentary bodies, a drum, a single endless flexible metal tape arranged to provide parallel flights movable in the same direction, an endless metal sheet providing a conveyor engaging the periphery of the drum, a roll spaced from the drum engaging the metal sheet, said parallel flights of the tape engaging the metal sheet, means for concomitantly rotating said creel to effect a winding of the filamentary bodies from the packages around the flights of the tape and rotating the drum to advance the metal sheet and the parallel flights of the tape, means for applying a bonding agent to the filamentary bodies, means for heat treating the bonding agent, said tape advancing at a rate whereby the angularity of deposition of the filamentary bodies on the tape flights forms an unwoven product, said bonding agent maintaining the filamentary bodies of the product in crossing relation, and means for removing the unwoven product from the flights of tape.

8. Apparatus of the character disclosed, in combination, a revoluble member adapted to support a plurality of packages of filamentary bodies, said revoluble member having an axial opening through which the filamentary bodies are withdrawn from the packages upon rotation of the revoluble member, means carried by the revoluble member for spacing the withdrawn filamentary bodies, a plurality of tubular means rotatable with the member, each of said tubular means adapted to accommodate a filamentary body, said tubular means being shaped to establish tension in the filamentary bodies prior to engagement of the filamentary bodies with the spacing means.

9. Apparatus of the character disclosed, in combination, a revoluble member adapted to support a plurality of packages of filamentary bodies, said revoluble member having an axial opening through which the filamentary bodies are withdrawn from the packages upon rotation of the revoluble member, a single endless tape arranged to provide a pair of spaced guides upon which the filamentary bodies are wound, means for advancing the guides in the same direction, means comprising a plurality of projections carried by the revoluble member for spacing the filamentary bodies, a plurality of tubular means rotatable with the member, each of said tubular means adapted to accommodate a filamentary body, said tubular means being shaped to establish tension in the filamentary bodies prior to engagement of the filamentary bodies with the spacing means and the guides.

10. An apparatus of the character disclosed, in combination, a rotatable creel adapted to support a plurality of packages of filamentary materials, a plurality of bars secured and extending radially from the creel, a package carrier including a spindle for each bar adapted to support a package, a member secured to the spindle and arranged for engagement with the bar, interengaging means formed on said bar and said member, said spindle and member being arranged whereby the weight of a package on the spindle maintains interengagement of said means.

11. An apparatus of the character disclosed, in combination, a rotatable creel adapted to support a plurality of packages of filamentary materails, a plurality of bars secured to and extending radially from the creel, a package carrier including a spindle for each bar adapted to support a package, a member secured to the spindle and arranged for slidable engagement with the bar, interengaging means formed on said bar and said member, said spindle and arm being arranged whereby the weight of a package on the spindle maintains interengagement of said means, said member being tiltable with respect to the bar to effect disengagement of said means and removal of the member from the bar.

12. An apparatus of the character disclosed, in combination, a rotatable creel adapted to support a plurality of packages of filamentary materials, a plurality of bars secured to and extending radially from the creel, a package carrier including a spindle for each bar adapted to support a package, an arm extending transversely from the spindle and adapted to embrace and end region of a bar, and interengaging means formed on said bar and said arm for preventing lengthwise movement of the arm relative to the bar.

13. Apparatus of the character disclosed, in combination, a main frame, a first roll journally supported on said main frame, a supplemental frame connected with the main frame, a second roll journally supported on the supplemental frame, an endless belt conveyor of sheet metal supported by said first and second rolls, a belt tensioning unit comprising arms pivotally secured to the main frame, a drum journaled upon said arms and engageable with said conveyor, means in said drum accommodating a circulating cooling fluid, said endless conveyor being arranged to engage an assemblage of unwoven fabric of mineral materials and a binder for conveying the assemblage to the region of the first roll, means in the first roll for applying heat to set the binder in the assemblage, and means carried by the tensioning unit and arranged to engage the assemblage of unwoven fabric and binder to size the thickness of the assemblage.

14. Apparatus of the character disclosed, in combination, an endless tape, rotatable means supporting the tape, said tape being crossed to provide two flights of tape moving in substantial parallel relation, means associated with each of said tape flights for maintaining the tape flights in uniformly spaced parallel relation, each of said means comprising a support, a member articulately mounted on the support, a roll journally supported on said member and adapted for engagement with an edge region of a tape flight and a pair of rolls journally supported upon said member for rotation about an axis normal to the axis of the roll engaging the edge of the tape flight, said pair of rolls being in frictional contact with the major faces of the tape flight whereby deviation of the tape flight effects pivotal movement of said member to cause the pair of rolls to correct the deviation of the tape flight.

15. Apparatus of the character disclosed, in combination, conveyor means adapted to advance a fabric, said conveyor means comprising a single endless tape in crossed relation providing a pair of spaced flights about which the fabric is formed, means for advancing the tape flights, and means for severing the fabric from the tape flights including a severing unit disposed adjacent each tape flight.

References Cited

UNITED STATES PATENTS

| | | | |
|---|---|---|---|
| 1,448,180 | 3/1923 | Atwood et al. | 161—55 |
| 2,126,837 | 8/1938 | Stewart et al. | 161—55 |
| 2,266,761 | 12/1941 | Jackson et al. | 161—57 |
| 2,414,125 | 1/1947 | Rheinfrank | 161—58 |
| 2,696,243 | 12/1954 | Holland | 161—55 |
| 2,732,885 | 1/1956 | Van Der Hoven | 65—4 |
| 2,797,728 | 7/1957 | Slayter et al. | 161—55 |
| 2,954,816 | 10/1960 | Havemann | 156—427 |
| 2,954,817 | 10/1960 | Havemann | 156—427 |
| 3,041,230 | 6/1962 | Diehl | 156—178 |

EARL M. BERGERT, *Primary Examiner.*

R. J. CARLSON, J. P. MELOCHE, *Assistant Examiners.*